US012322333B2

(12) United States Patent
Wang et al.

(10) Patent No.: US 12,322,333 B2
(45) Date of Patent: Jun. 3, 2025

(54) DISPLAY DEVICE

(71) Applicant: SAMSUNG DISPLAY CO., LTD., Yongin-si (KR)

(72) Inventors: Seongmin Wang, Yongin-si (KR); Yongho Yang, Yongin-si (KR); Jihye Kong, Yongin-si (KR); Jeongsoo Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/153,662

(22) Filed: Jan. 12, 2023

(65) Prior Publication Data

US 2023/0169923 A1 Jun. 1, 2023

Related U.S. Application Data

(63) Continuation of application No. 17/101,366, filed on Nov. 23, 2020, now Pat. No. 11,580,906.

(30) Foreign Application Priority Data

Mar. 3, 2020 (KR) ........................ 10-2020-0026790

(51) Int. Cl.
*G09G 3/3233* (2016.01)
*G09G 3/20* (2006.01)

(52) U.S. Cl.
CPC ......... *G09G 3/3233* (2013.01); *G09G 3/2003* (2013.01); *G09G 2320/0242* (2013.01)

(58) Field of Classification Search
CPC ............... G09G 3/3233; G09G 3/2003; G09G 2320/0242; G09G 2310/0256; G09G 2320/0238; G09G 2300/0819; G09G 2300/0842; G09G 2300/0861; G09G 2320/045; G09G 3/3225; G09G 2300/0439; G09G 2300/0469; G09G 2310/0245
See application file for complete search history.

(56) References Cited

U.S. PATENT DOCUMENTS

| | | | | |
|---|---|---|---|---|
| 7,414,599 | B2 | 8/2008 | Chung et al. | |
| 9,024,934 | B2 | 5/2015 | Park et al. | |
| 11,763,757 | B2 * | 9/2023 | Zhao | G09G 3/3233 345/76 |
| 2014/0118409 | A1 | 5/2014 | Jun et al. | |
| 2014/0145917 | A1 * | 5/2014 | Kwak | G09G 3/3233 345/82 |

(Continued)

FOREIGN PATENT DOCUMENTS

| | | |
|---|---|---|
| KR | 10-2005-0005646 | 1/2005 |
| KR | 10-2014-0013586 | 2/2014 |

(Continued)

*Primary Examiner* — Jeff Piziali
(74) *Attorney, Agent, or Firm* — F. CHAU & ASSOCIATES, LLC

(57) ABSTRACT

A display device includes pixels, and each pixel is connected between a first electrode or a second electrode of a driving transistor and a bias line, includes a bias transistor configured to transfer a bias voltage applied from the bias line to the first electrode or the second electrode of the driving transistor during a bias period. Bias voltages applied to the pixels emitting light of different colors are different from each other.

16 Claims, 23 Drawing Sheets

(56) References Cited

U.S. PATENT DOCUMENTS

| | | | | |
|---|---|---|---|---|
| 2015/0287362 | A1* | 10/2015 | Lee | G09G 3/3266<br>315/173 |
| 2016/0125809 | A1* | 5/2016 | Hwang | G09G 3/3258<br>345/212 |
| 2016/0351122 | A1* | 12/2016 | Jung | G09G 3/2085 |
| 2018/0075804 | A1 | 3/2018 | Kim et al. | |
| 2019/0130835 | A1 | 5/2019 | Ka et al. | |
| 2019/0221165 | A1 | 7/2019 | Park et al. | |
| 2020/0327853 | A1* | 10/2020 | Li | G09G 3/3233 |
| 2021/0142733 | A1 | 5/2021 | Kim et al. | |
| 2021/0280130 | A1 | 9/2021 | Wang et al. | |
| 2021/0328002 | A1* | 10/2021 | Lee | H10K 59/1315 |
| 2021/0335953 | A1 | 10/2021 | Kim et al. | |
| 2021/0375193 | A1 | 12/2021 | Son et al. | |
| 2022/0101777 | A1* | 3/2022 | Kim | G09G 3/3233 |
| 2022/0199017 | A1* | 6/2022 | Kim | G09G 3/3275 |
| 2022/0208110 | A1* | 6/2022 | Yu | G09G 3/3266 |

FOREIGN PATENT DOCUMENTS

| | | |
|---|---|---|
| KR | 10-2014-0053606 A | 5/2014 |
| KR | 10-2018-0029133 A | 3/2018 |
| KR | 10-2019-0049995 | 5/2019 |
| KR | 10-2019-0087695 | 7/2019 |

* cited by examiner

DISPLAY DEVICE

CROSS-REFERENCE TO RELATED APPLICATION

This application is a continuation of U.S. application Ser. No. 17/101,366 filed on Nov. 23, 2020, which claims the benefit of Korean Patent Application No. 10-2020-0026790, filed on Mar. 3, 2020, in the Korean Intellectual Property Office, the disclosure of which is incorporated by reference herein in its entirety.

BACKGROUND

1. Field

The present inventive concept relates to a display device, more particularly, a display device with a bias transistor.

2. Description of Related Art

An organic light-emitting display device includes a plurality of pixels each including an organic light-emitting diode and a thin film transistor. Driving transistor characteristics and organic light-emitting diode characteristics of pixels emitting light of different colors may be different from each other.

SUMMARY

One or more embodiments include a display device which may minimize a current deviation for each pixel and adjust white balance by compensating for a characteristic of a driving transistor and/or a characteristic of a light-emitting diode for each pixel.

Additional aspects will be set forth in part in the description which follows and, in part, will be apparent from the description, or may be learned by practice of the presented embodiments of the disclosure.

According to an exemplary embodiment of the present inventive concept, a display device includes a plurality of pixels, and each of the plurality of pixels includes a light-emitting diode, a driving transistor including a gate electrode, a first electrode connected to a node, and a second electrode connected to the light-emitting diode, the driving transistor being configured to transfer a driving current to the light-emitting diode, a switching transistor connected between a data line and the node and configured to transfer a data signal applied to the data line to the node during a data write period, a compensation transistor connected between the gate electrode and the second electrode of the driving transistor and configured to connect the gate electrode of the driving transistor to the second electrode of the driving transistor during a compensation period, and a bias transistor connected between at least one of the first electrode and the second electrode of the driving transistor and a bias line and configured to transfer a bias voltage applied from the bias line to the at least one of the first electrode and the second electrode of the driving transistor during a bias period, wherein a first bias voltage applied to a first pixel emitting light of a first color among the plurality of pixels is different from a second bias voltage applied to a second pixel emitting light of a second color among the plurality of pixels.

The bias period may precede the data write period, and the compensation period may follow the data write period.

The bias period may follow the data write period, and the compensation period may follow the data write period.

Each of the plurality of pixels may further include a first initialization transistor connected between the gate electrode of the driving transistor and a first initialization voltage line and configured to transfer a first initialization voltage to the gate electrode of the driving transistor during an initialization period, the first initialization voltage being applied from the first initialization voltage line, and a second initialization transistor connected between the light-emitting diode and a second initialization voltage line and configured to transfer a second initialization voltage to a first electrode of the light-emitting diode during the bias period, the second initialization voltage being applied from the second initialization voltage line.

Each of the plurality of pixels may further include a capacitor connected between the gate electrode of the driving transistor and a driving voltage line.

A third bias voltage applied to a third pixel emitting light of a third color among the plurality of pixels may be the same as the first bias voltage applied to the first pixel or the second bias voltage applied to the second pixel.

The bias transistor may include a first bias transistor and a second bias transistor, the first bias transistor being connected between the first electrode of the driving transistor and the bias line, and the second bias transistor being connected between the second electrode of the driving transistor and the bias line, wherein the first bias transistor and the second bias transistor may be simultaneously turned on.

According to an exemplary embodiment of the present inventive concept, a display device including a plurality of pixels includes each of the plurality of pixels, including a light-emitting diode, a driving transistor including a gate electrode, a first electrode connected to a node, and a second electrode connected to the light-emitting diode, the driving transistor being configured to transfer a driving current to the light-emitting diode, a switching transistor connected between a data line and the node and configured to transfer a data signal applied to the data line to the node during a data write period, a compensation transistor connected between the gate electrode and the second electrode of the driving transistor and configured to connect the gate electrode of the driving transistor to the second electrode of the driving transistor during a compensation period, and a bias transistor connected between at least one of the first electrode and the second electrode of the driving transistor and a bias line and configured to transfer a bias voltage applied from the bias line to the at least one of the first electrode and the second electrode of the driving transistor during a bias period, wherein the bias transistor is turned on by an on-voltage of a bias control signal applied to a gate electrode of the bias transistor, a first on-voltage application time of a first bias control signal applied to a first pixel emitting light of a first color among the plurality of pixels is different from a second on-voltage application time of a second bias control signal applied to a second pixel emitting light of a second color among the plurality of pixels.

The bias period may precede the data write period, and the compensation period may follow the data write period.

The bias period may follow the data write period, and the compensation period may follow the data write period.

The first on-voltage application time of the bias control signal applied to the first pixel may be twice the second on-voltage application time of the bias control signal applied to the second pixel.

Each of the plurality of pixels may further include a first initialization transistor connected between the gate electrode of the driving transistor and a first initialization voltage line and configured to transfer a first initialization voltage to the gate electrode of the driving transistor during an initialization period, the first initialization voltage being applied from the first initialization voltage line, and a second initialization transistor connected between the light-emitting diode and a second initialization voltage line and configured to transfer a second initialization voltage to a first electrode of the light-emitting diode during the bias period, the second initialization voltage being applied from the second initialization voltage line.

Each of the plurality of pixels may further include a capacitor connected between the gate electrode of the driving transistor and a driving voltage line.

A third on-voltage application time of a third bias control signal applied to a third pixel emitting light of a third color among the plurality of pixels may be the same as the first on-voltage application time of the first bias control signal applied to the first pixel or the second on-voltage application time of the second bias control signal applied to the second pixel.

According to one or more embodiments, a display device including a plurality of pixels includes each of the plurality of pixels, including a light-emitting diode, a driving transistor including a gate electrode, a first electrode connected to a node, and a second electrode connected to the light-emitting diode, the driving transistor being configured to transfer a driving current to the light-emitting diode, a switching transistor connected between a data line and the node and configured to transfer a data signal applied to the data line to the node during a data write period, a compensation transistor connected between the gate electrode and the second electrode of the driving transistor and configured to connect the gate electrode of the driving transistor to the second electrode of the driving transistor during a compensation period, and a second initialization transistor connected between the light-emitting diode and a second initialization voltage line and configured to transfer a second initialization voltage to a first electrode of the light-emitting diode, the second initialization voltage being applied from the second initialization voltage line, wherein a second initialization voltage applied to a first pixel emitting light of a first color among the plurality of pixels is different from a second initialization voltage applied to a second pixel emitting light of a second color among the plurality of pixels.

Each of the plurality of pixels may further include a first initialization transistor connected between the gate electrode of the driving transistor and a first initialization voltage line and configured to transfer a first initialization voltage to the gate electrode of the driving transistor during an initialization period, the first initialization voltage being applied from the first initialization voltage line, and a bias transistor connected between the first electrode or the second electrode of the driving transistor and a bias line and configured to transfer a bias voltage to the first electrode or the second electrode of the driving transistor during the bias period, the bias voltage being applied from a bias line.

The bias period may precede the data write period, and the compensation period may follow the data write period.

The bias period may follow the data write period, and the compensation period may follow the data write period.

Each of the plurality of pixels may further include a capacitor connected between the gate electrode of the driving transistor and a driving voltage line.

A second initialization voltage applied to a third pixel emitting light of a third color among the plurality of pixels may be the same as the second initialization voltage applied to the first pixel or the second initialization voltage applied to the second pixel.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
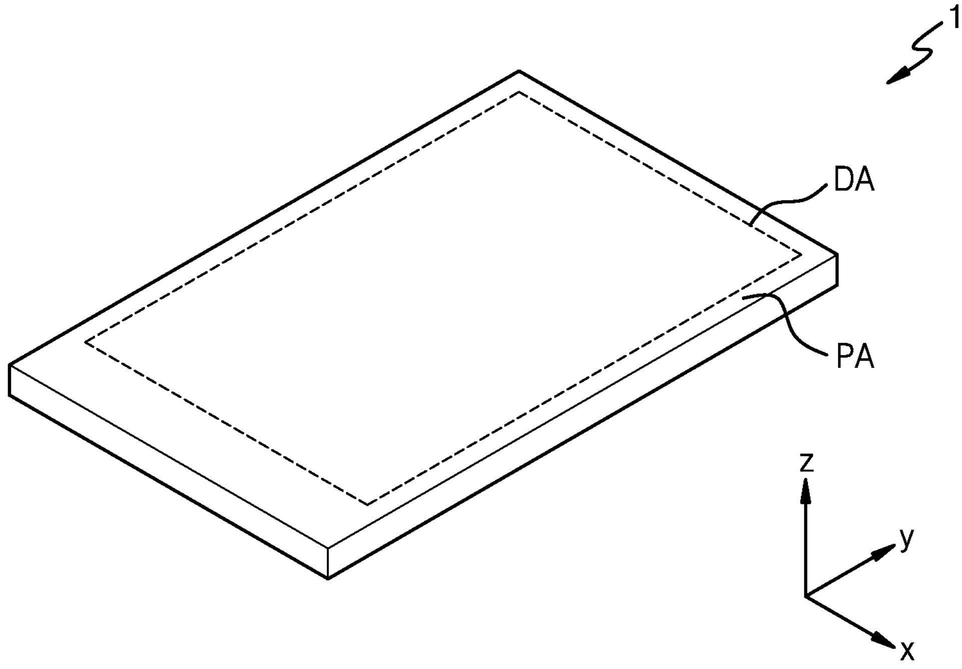
FIG. 1 is a perspective view of a display device according to an exemplary embodiment of the present inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

It will be understood that although the terms "first," "second," etc. may be used herein to describe various elements, these elements should not be limited by these terms. These terms are only used to distinguish one element from another.

As used herein, the singular forms "a," "an," and "the" are intended to include the plural forms as well, unless the context clearly indicates otherwise.

It will be further understood that the terms "comprises" and/or "comprising" used herein specify the presence of stated features or elements, but do not preclude the presence or addition of one or more other features or elements.

It will be understood that when a layer, region (area), or element is referred to as being "formed on," another layer, region, or element, it can be directly or indirectly formed on the other layer, region, or element. That is, for example, intervening layers, regions, or elements may be present.

Sizes of elements in the drawings may be exaggerated or reduced for convenience of explanation. In other words, since sizes and thicknesses of elements in the drawings are arbitrarily illustrated for convenience of explanation, the following embodiments are not limited thereto.

In the present specification, "A and/or B" means A or B, or A and B. In the present specification, "at least one of A and B" means A or B, or A and B.

As used herein, when a wiring is referred to as "extending in a first direction or a second direction", it means that the wiring not only extends in a straight line shape but also extends in a zigzag or in a curve in the first direction or the second direction.

As used herein, "on a plan view" means that an objective portion is viewed from above, and "on a cross-sectional view" means that a cross-section of an objective portion taken vertically is viewed from a lateral side. As used herein, when a first element is referred to as "overlapping" a second element, the first element is located above or below the second element.

As used therein, when X is referred to as being connected to Y, it includes the case where X is electrically connected to Y, the case where X is functionally connected to Y, and the case where X is directly connected to Y. Here, X and Y may include an object (e.g. an apparatus, a device, a circuit, a wiring, an electrode, a terminal, a conductive layer, a layer, etc.). Therefore, a connection relationship is not limited to a predetermined connection relationship, for example, a connection relationship shown in the drawing or the detailed description and may include other connection relationships in addition to the connection relationship shown in the drawing or the detailed description.

The case where X is electrically connected to Y may include, for example, the case where at least one element (e.g. a switch, a transistor, a capacitance element, an inductor, a resistance element, a diode, a wiring, an electrode, a terminal, a conductive layer, a layer, etc.) that enables an electric connection of X and Y is connected between X and Y.

As used herein, "ON" used in association with an element state may denote a state in which the element is activated, and "OFF" may denote a state in which the element is inactivated. "ON" used in association with a signal received by an element may denote a signal configured to activate the element, and "OFF" may denote a signal configured to inactivate the element. An element may be activated by a high-level voltage or a low-level voltage. For example, a P-channel transistor is activated by a low-level voltage and an N-channel transistor is activated by a high-level voltage. Therefore, it should be understood that "ON" voltages for a P-channel transistor and an N-channel transistor are opposite voltage levels (low versus high), respectively.

FIG. 1 is a perspective view of a display device 1 according to an embodiment.

The display devices 1 according to an embodiment may include electronic devices such as smartphones, mobile phones, smartwatches, navigation apparatuses, game consoles, televisions (TV), head units for an automobiles, notebook computers, lap-top computers, tablet computers, personal media players (PMP), and personal digital assistants (PDA). In addition, the electronic devices may include flexible devices.

The display device 1 may include a display area DA and a peripheral area PA, an image being displayed on the display area DA, and the peripheral area PA being arranged outside the display area DA. The display device 1 may display a predetermined image by using light emitted from a plurality of pixels arranged in the display area DA.

The display device 1 may be prepared in various shapes. For example, the display device 1 may be prepared in a rectangular plate shape having two pairs of sides parallel to each other. In the case where the display device 1 is prepared in a rectangular plate-shape, one of the two pairs of sides may be longer than the other. In an embodiment, for convenience of description, the case where the display device has a rectangular shape having a pair of long sides and a pair of short sides is shown. An extension direction of the short side is shown as a first direction (an x-direction), an extension direction of the long side is shown as a second direction (a y-direction), and a direction perpendicular to the extension directions of the long side and the short side is shown as a third direction (a z-direction). In an embodiment, the display device 1 may have a non-quadrangular shape. The non-quadrangular shape may include, for example, a circular shape, an elliptical shape, a polygonal shape in which a portion thereof is circular, and a polygonal shape excluding the quadrangular shape.

When the display area DA is viewed in a plan view, the display area DA may have a rectangular shape as shown in FIG. 1. In an embodiment, the display area DA may have a polygonal shape such as a triangular shape, a pentagonal shape, a hexagonal shape, a circular shape, an elliptical shape, and an irregular shape.

The peripheral area PA is an area outside the display area DA and may include a kind of non-display area in which pixels are not arranged. The display area DA may be entirely surrounded by the peripheral area PA. Various wirings or pads on which a printed circuit board or a driver integrated circuit (IC) chip is attached may be located in the peripheral area PA, the various wirings being configured to transfer an electric signal to apply to the display area DA.

Hereinafter, though an organic light-emitting display device is described as the display device 1 according to an embodiment as an example, the display device 1 is not limited thereto. In an embodiment, the display device 1 according to an embodiment may include display devices such as inorganic light-emitting displays and quantum-dot light-emitting displays.

Figure 2:
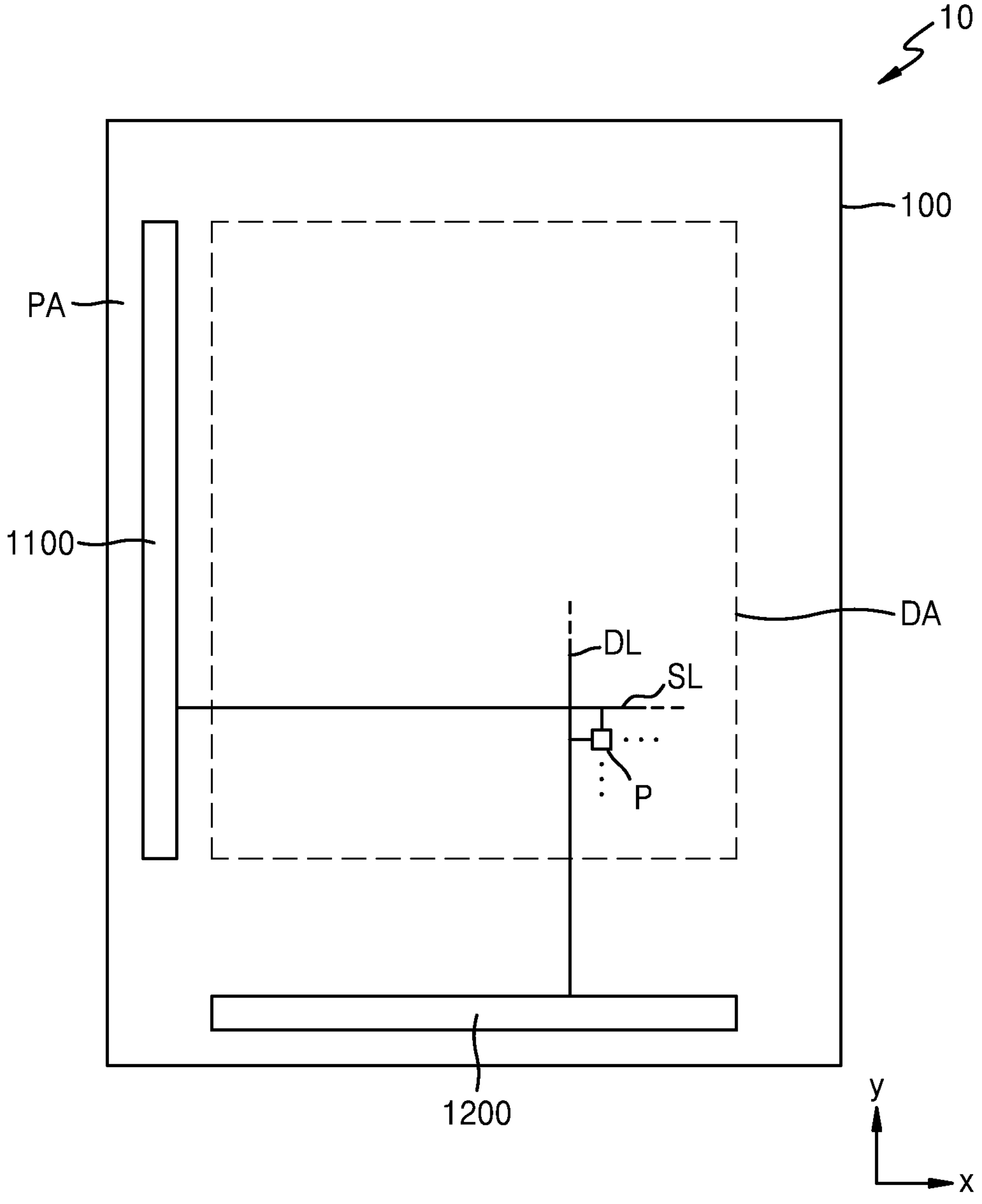
FIG. 2 is a plan view of a display panel according to an exemplary embodiment of the present inventive concept.

FIG. 2 is a plan view of a display panel 10 according to an embodiment.

The display device 1 may include the display panel 10 configured to display an image. FIG. 2 shows a substrate 100 of the display panel 10. For example, the substrate 100 may include the display area DA and the peripheral area PA.

Referring to FIG. 2, the display panel 10 includes pixels P arranged in the display area DA. The pixels P may include a display element. The display element may be connected to a pixel circuit. The display element may include an organic light-emitting diode or a quantum-dot organic light-emitting diode. Each pixel P may emit, for example, red, green, blue, or white light from a display element.

A scan driver 1100, a data driver 1200, a main power wiring (not shown), etc. may be arranged in the peripheral area PA, the scan driver 1100 being configured to provide a scan signal to a pixel circuit of each pixel P, the data driver 1200 being configured to provide a data signal to a pixel circuit of each pixel P, and the main power wiring being configured to provide a power voltage. The data driver 1200 is arranged close to on one side of the substrate 100. The present inventive concept, however, is not limited thereto. In an embodiment, the data driver 1200 may be arranged on a flexible printed circuit board (FPCB) which is electrically connected to a pad arranged on one side of the display panel 10. The scan driver 1100 may be provided in plural.

An input sensing layer and an optical functional layer may be further provided over the display panel 10. The display panel 10, the input sensing layer, and the optical functional layer may be covered by a window. The input sensing layer may obtain coordinate information corresponding to an external input, for example, a touch event. The input sensing layer may sense an external input by using a mutual capacitive method and/or a self-capacitive method. The optical functional layer may include a reflection prevention layer, and the reflection prevention layer may include a retarder and a polarizer. In an embodiment, the reflection prevention layer may include a black matrix and color filters.

Figure 3A:
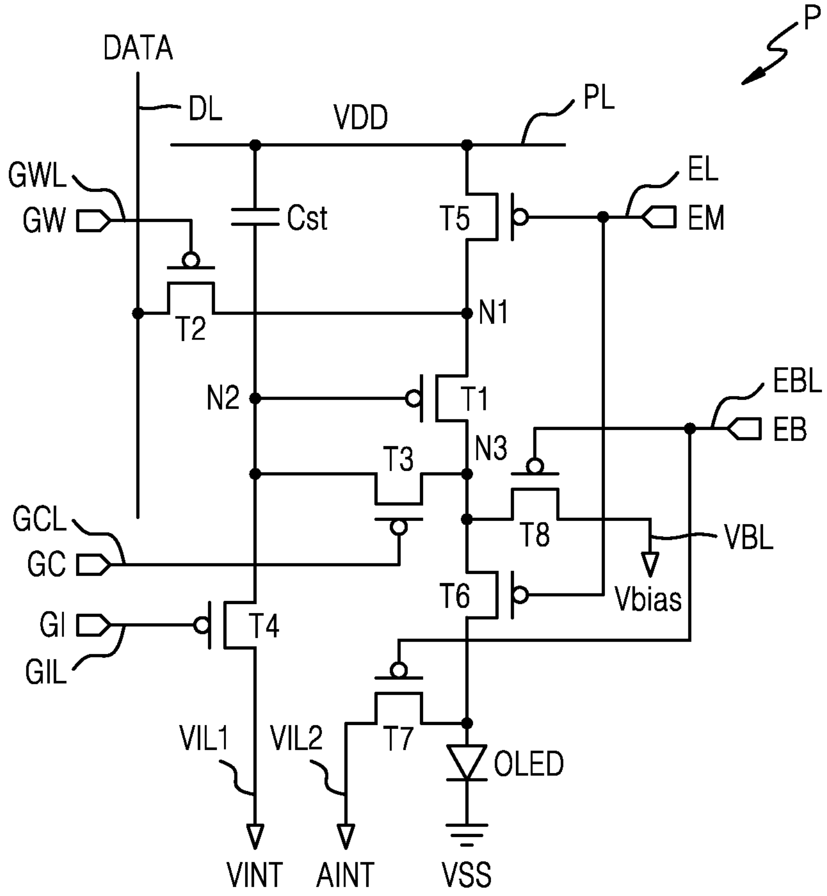
FIGS. 3A to 3C are views showing an example of a pixel of a display device according to an exemplary embodiment of the present inventive concept.
Figure 3B:
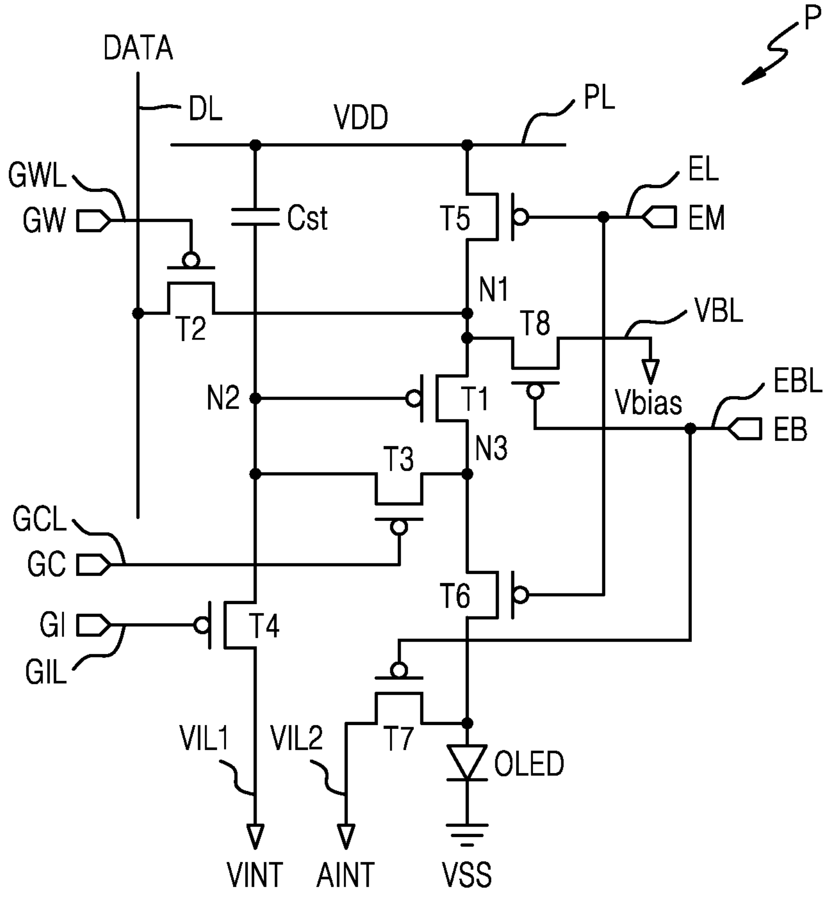
Figure 3C:
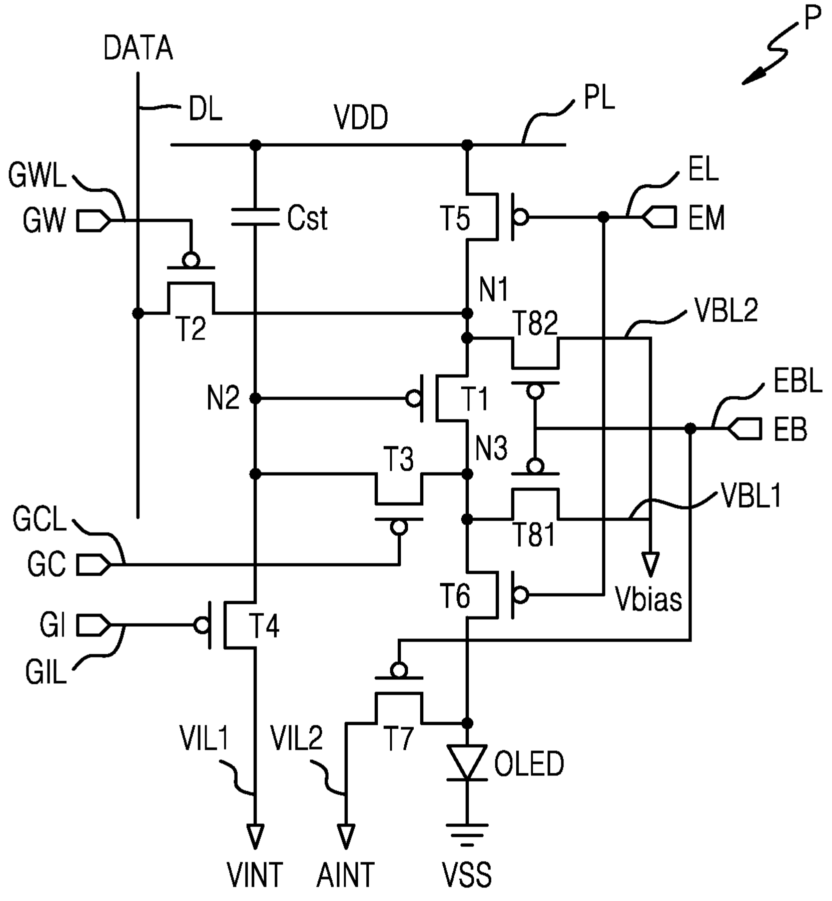
Figure 4A:
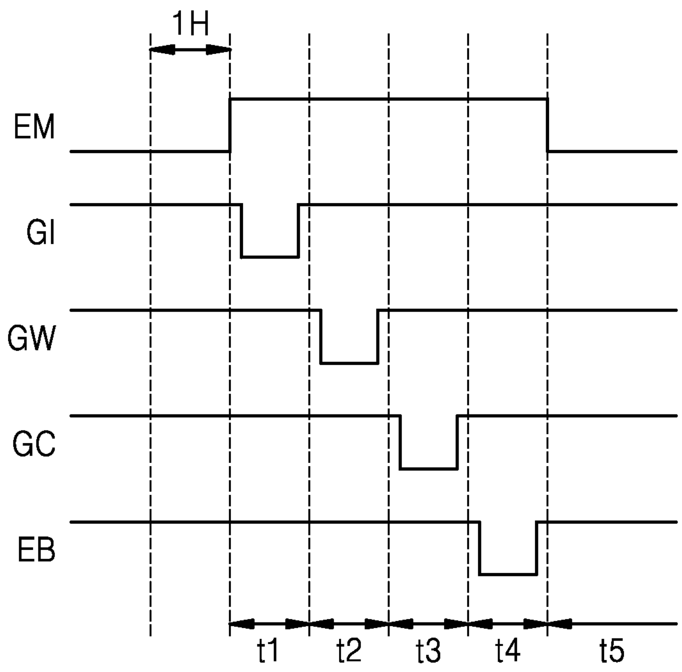
FIGS. 4A and 4B are a timing diagram of a method of driving a pixel according to an exemplary embodiment of the present inventive concept.
Figure 4B:
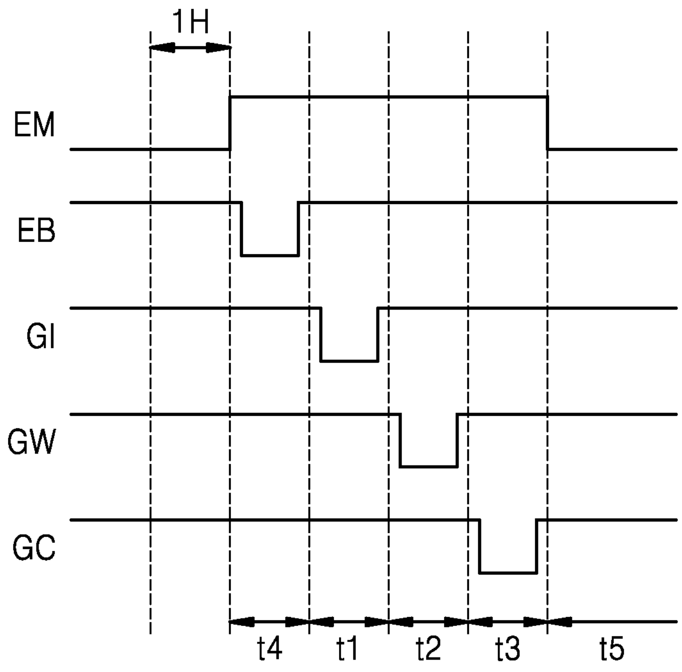

FIGS. 3A to 3C are views showing an example of a pixel of the display device 1 according to an embodiment. FIGS. 4A and 4B are a timing diagram of a method of driving a pixel according to an embodiment.

Referring to FIG. 3A, a pixel P may include an organic light-emitting diode OLED and a pixel circuit connected to the organic light-emitting diode OLED, the organic light-emitting diode OLED serving as a display element. The pixel circuit may include first to eighth transistors T1, T2, T3, T4, T5, T6, T7, and T8. The first to eighth transistors T1, T2, T3, T4, T5, T6, T7, and T8 may be implemented as thin film transistors. A first terminal of each of the first to eighth transistors T1, T2, T3, T4, T5, T6, T7, and T8 may include a source terminal or a drain terminal depending on a kind (p-type or n-type) of transistor and/or an operation condition of a transistor. The second terminal may be different from the first terminal. For example, in the case where the first terminal is a source terminal, the second terminal is a drain terminal.

The pixel circuit may be connected to a first scan line GWL, a second scan line GIL, a third scan line GCL, an emission control line EL, a bias control line EBL, and a data line DL, the first scan line GWL being configured to transfer a first scan signal GW, the second scan line GIL being configured to transfer a second scan signal GI, the third scan line GCL being configured to transfer a third scan signal GC, the emission control line EL being configured to transfer an emission control signal EM, the bias control line EBL being configured to transfer a bias control signal EB, and the data line DL being configured to transfer a data signal DATA.

A driving voltage line PL may transfer a driving voltage VDD to the first transistor T1. A first initialization voltage line VIL1 may be configured to transfer a first initialization voltage VINT to a gate electrode of the first transistor T1 via the fourth transistor T4. A second initialization voltage line VIL2 may be configured to transfer a second initialization voltage AINT to an organic light-emitting diode OLED via the seventh transistor T7. A bias line VBL may be configured to transfer a bias voltage Vbias to a source terminal or a drain terminal of the first transistor T1 via the eighth transistor T8.

The first transistor T1 includes a gate terminal, a first terminal, and a second terminal, the gate terminal being connected to a second node N2, the first terminal being connected to a first node N1, and the second terminal being connected to a third node N3. The first transistor T1 serves as a driving transistor and is configured to receive a data signal DATA depending on a switching operation of the second transistor T2 and supply a driving current to the organic light-emitting diode OLED.

The second transistor T2 (a switching transistor) includes a gate terminal, a first terminal, and a second terminal, the gate terminal being connected to the first scan line GWL, the first terminal being connected to the data line DL, and the second terminal being connected to the first node N1 (or the first terminal of the first transistor T1). The second transistor T2 may be turned on in response to a first scan signal GW transferred through the first scan line GWL, and configured to perform a switching operation of transferring a data signal DATA transferred through the data line DL to the first node N1.

The third transistor T3 (a compensation transistor) includes a gate terminal, a first terminal, and a second terminal, the gate terminal being connected to the third scan line GCL, the first terminal being connected to the third node N3 (or the second terminal of the first transistor T1), and the second terminal being connected to the second node (or the gate terminal of the first transistor T1). The third transistor T3 may be turned on in response to a third scan signal GC transferred through the third scan line GCL and may diode-connect the first transistor T1.

The fourth transistor T4 (a first initialization transistor) includes a gate terminal, a first terminal, and a second terminal, the gate terminal being connected to the second scan line GIL, the first terminal being connected to the first initialization voltage line VIL1, and the second terminal being connected to the second node (or the gate terminal of the first transistor T1). The fourth transistor T4 is turned on in response to a second scan signal GI transferred through the second scan line GIL and may initialize a gate voltage of the first transistor T1 by transferring the first initialization voltage VINT to the gate terminal of the first transistor T1.

The fifth transistor T5 (a first emission control transistor) includes a gate terminal, a first terminal, and a second terminal, the gate terminal being connected to the emission control line EL, the first terminal being connected to the driving voltage line PL, and the second terminal being connected to the first node (or the first terminal of the first transistor T1). The sixth transistor (a second emission control transistor) includes a gate terminal, a first terminal, and a second terminal, the gate terminal being connected to the emission control line EL, the first terminal being connected to the third node (or the second terminal of the first transistor T1), and the second terminal being connected to a pixel electrode of the organic light-emitting diode OLED. The fifth transistor T5 and the sixth transistor T6 are simultaneously turned on in response to an emission control signal EM transferred through the emission control line EL, and a current flows through the organic light-emitting diode OLED.

The seventh transistor T7 (a second initialization transistor) includes a gate terminal, a first terminal, and a second terminal, the gate terminal being connected to the bias control line EBL, the first terminal being connected to the second terminal of the sixth transistor T6 and the pixel electrode of the organic light-emitting diode OLED, and the second terminal being connected to the second initialization voltage line VIL2. The seventh transistor T7 is turned on in response to a bias control signal EB transferred through the bias control line EBL and may initialize a voltage of the pixel electrode of the organic light-emitting diode OLED by transferring the second initialization voltage AINT to the pixel electrode of the organic light-emitting diode OLED. The seventh transistor T7 may be omitted.

The eighth transistor T8 (a bias transistor) includes a gate terminal, a first terminal, and a second terminal, the gate terminal being connected to the bias control line EBL, the first terminal being connected to the bias line VBL, and the second terminal being connected to the third node N3 (or the second terminal of the first transistor T1). The eighth transistor T8 is turned on in response to a bias control signal EB transferred through the bias control line EBL and may control a current (a driving current) between a source terminal and a drain terminal of the first transistor T1 by applying the bias voltage Vbias to the second terminal of the first transistor T1.

A capacitor Cst includes a first electrode and a second electrode, the first electrode being connected to the second node N2 (or the gate terminal of the first transistor T1), and the second electrode being connected to the driving voltage line PL.

The organic light-emitting diode OLED may include a pixel electrode and an opposite electrode facing the pixel electrode, the opposite electrode receiving a common voltage VSS. The opposite electrode may include a common electrode which is common to a plurality of pixels P. The common voltage VSS may include a voltage lower than a driving voltage VDD. The first initialization voltage VINT and the second initialization voltage AINT may include a voltage lower than the common voltage VSS.

Though it is shown in FIG. 3A that the third transistor T3 and the fourth transistor T4 include a single transistor, the third transistor T3 and the fourth transistor T4 may have a structure in which two or more transistors are series-connected.

Though FIG. 3A shows an embodiment in which the second terminal of the eighth transistor T8 is connected to the third node N3 (or the second terminal of the first transistor T1), the embodiment is not limited thereto. For example, as shown in FIG. 3B, the second terminal of the eighth transistor T8 may be connected to the first node N1 (or the first terminal of the first transistor T1). Alternatively, as shown in FIG. 3C, the eighth transistor T8 may include two transistors T81 and T82. A second terminal of the eighth transistor T81 is connected to the third node N3 (or the second terminal of the first transistor T1), and a second terminal of the eighth transistor T82 is connected to the first node N1 (or the first terminal of the first transistor T1). Gate terminals of the two transistors T81 and T82 of the eighth transistor T8 may be connected to the bias control line EBL, and the first terminals of the two transistors T81 and T82 of the eighth transistor T8 may be connected to the bias line VBL comprising a first bias line VBL1 and a second bias line VBL2.

The organic light-emitting diode OLED may display an image by receiving the driving current from the first transistor T1 and emitting light having a predetermined color. The driving current is determined by a threshold voltage Vth of the first transistor T1, a voltage Vgs between the gate terminal and a source terminal of the first transistor T1, and a voltage Vds between the source terminal and a drain terminal of the first transistor T1. Characteristics (e.g. the voltages Vth, Vgs, and Vds) of the first transistor T1 and characteristics (e.g. a capacitance) of the organic light-emitting diode OLED are different for each pixel. Color coordinates of the display panel may change (e.g. reddish) when the display panel is driven by, for example, the data driver 1200 and/or the scan driver 1100 using high frequencies. According to an embodiment, a brightness deviation (a current deviation) and a color coordinate change for each pixel may be reduced by controlling a voltage of the source terminal and/or the drain terminal of the first transistor T1 through the eighth transistor T8 of a pixel, and thus controlling the driving current.

Referring to FIG. 4A, a pixel P may operate divisionally from first to fifth periods t1, t2, t3, t4, and t5 for each frame. First to third scan signals GW, GI, and GC, and a bias control signal EB may have an on-voltage during a first horizontal period 1H. Here, the on-voltage may correspond to a turn-on voltage of a transistor and may include a low-level voltage. Since the first to eighth transistors T1, T2, T3, T4, T5, T6, T7, and T8 of the pixel circuit are p-type transistors, the turn-on voltage may be a low-level voltage. The present inventive concept is not limited thereto. In an embodiment, at least one of the first to eighth transistors T1, T2, T3, T4, T5, T6, T7, and T8 may be an n-type transistor which turns on with a high-level voltage.

The first period t1 corresponds to an initialization period during which the second node N2 connected to the gate terminal of the first transistor T1 is initialized and an on-bias is applied to the gate terminal of the first transistor T1. During the first period t1, a second scan signal GI of a low level is applied to the second scan line GIL, and accordingly the fourth transistor T4 is turned on, and a voltage of the second node N2, that is, a voltage of the gate terminal of the first transistor T1 is initialized by the first initialization voltage VINT supplied through the first initialization voltage line VIL1.

The second period t2 corresponds to a data write period. During the second period t2, a first scan signal GW of a low level is applied to the first scan line GWL and accordingly the second transistor T2 is turned on and a data signal DATA supplied through the data line DL is transferred to the first node N1.

The third period t3 corresponds to a compensation period during which the threshold voltage of the first transistor T1 is compensated for. During the third period t3, a third scan signal GC of a low level is applied to the third scan line GCL and accordingly the third transistor T3 is turned on. The first transistor T1 is diode-connected by the third transistor T3 that is turned on, and a compensation voltage in which the threshold voltage of the first transistor T1 is compensated from a data signal DATA is applied to the second node N2, that is, the gate terminal of the first transistor T1. The driving voltage VDD and the compensation voltage are respectively applied to two opposite electrodes of the capacitor Cst, and a charge corresponding to a voltage difference between the two opposite electrodes of the capacitor Cst is stored in the capacitor Cst.

The fourth period t4 corresponds to a bias period during which the pixel electrode of the organic light-emitting diode OLED is initialized, and an on-bias voltage is applied to the source terminal or/and the drain terminal of the first transistor T1. During the fourth period t4, a bias control signal EB of a low level is applied to the bias control line EBL and accordingly the seventh transistor T7 and the eighth transistor T8 are turned on. The second initialization voltage AINT supplied through the second initialization voltage line VIL2 is applied to the pixel electrode of the organic light-emitting diode OLED by the seventh transistor t7 that is turned on. A bias voltage Vbias supplied through the bias line VBL is applied to the second terminal (or/and the first terminal) of the first transistor T1 by the eighth transistor T8.

An emission control signal EM supplied to the emission control line EL maintains a high level during the first to fourth periods t1, t2, t3, and t4 and makes a transition from the high level to a low level during the fifth period t5. The fifth period t5 corresponds to an emission period during which the organic light-emitting diode OLED emits light. During the fifth period t5, the fifth transistor T5 and the sixth transistor T6 are turned on. In addition, the driving current corresponding to the charge stored in the capacitor Cst is supplied to the organic light-emitting diode OLED through the first transistor T1 and accordingly the organic light-emitting diode OLED emits light.

In an embodiment, as shown in FIG. 4B, the fourth period t4 may precede the first period t1, and the fifth period t5 may follow the third period t3.

Figure 5:
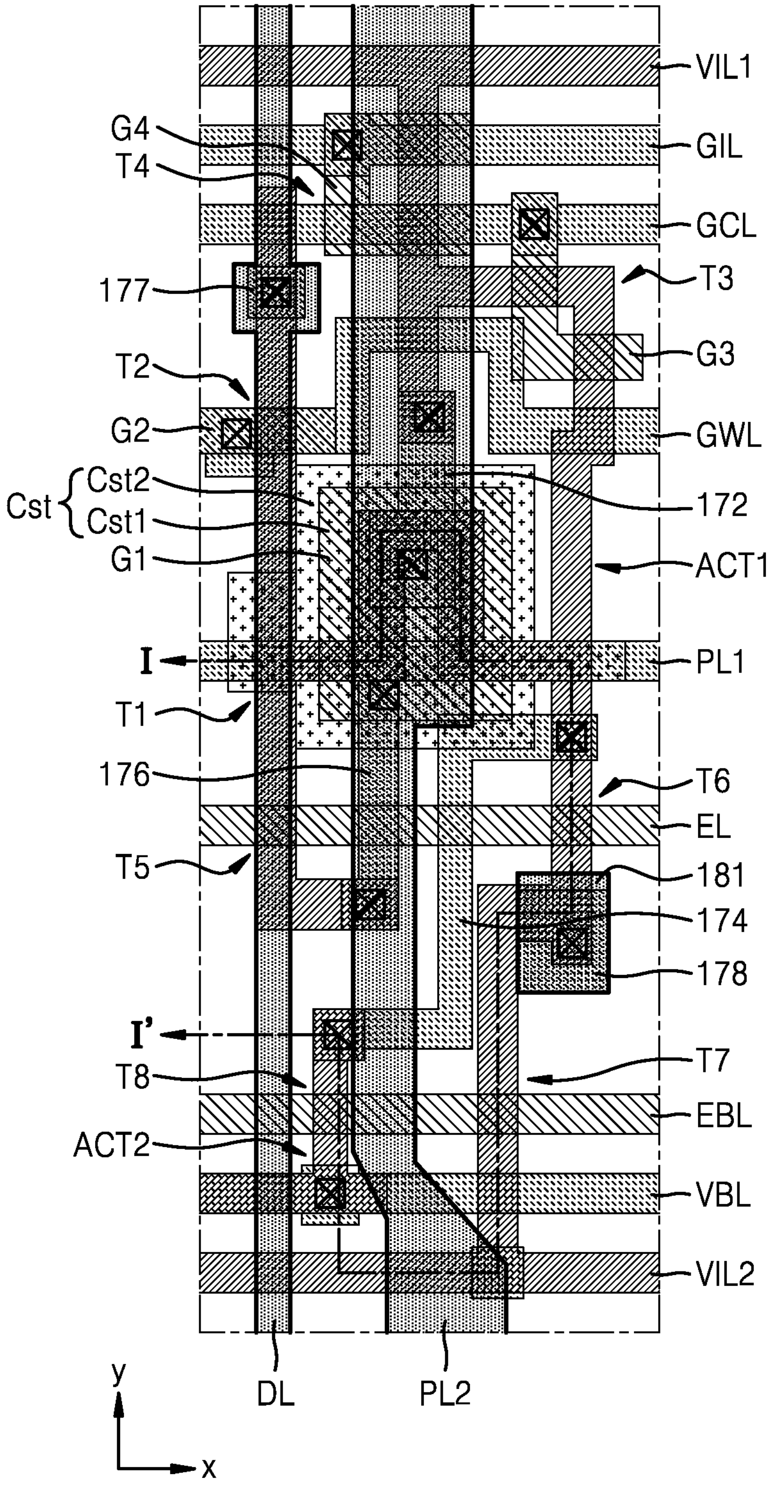
FIG. 5 is an arrangement view of locations of a plurality of thin film transistors and a capacitor each arranged in a pixel circuit according to an exemplary embodiment of the present inventive concept.
Figure 6:
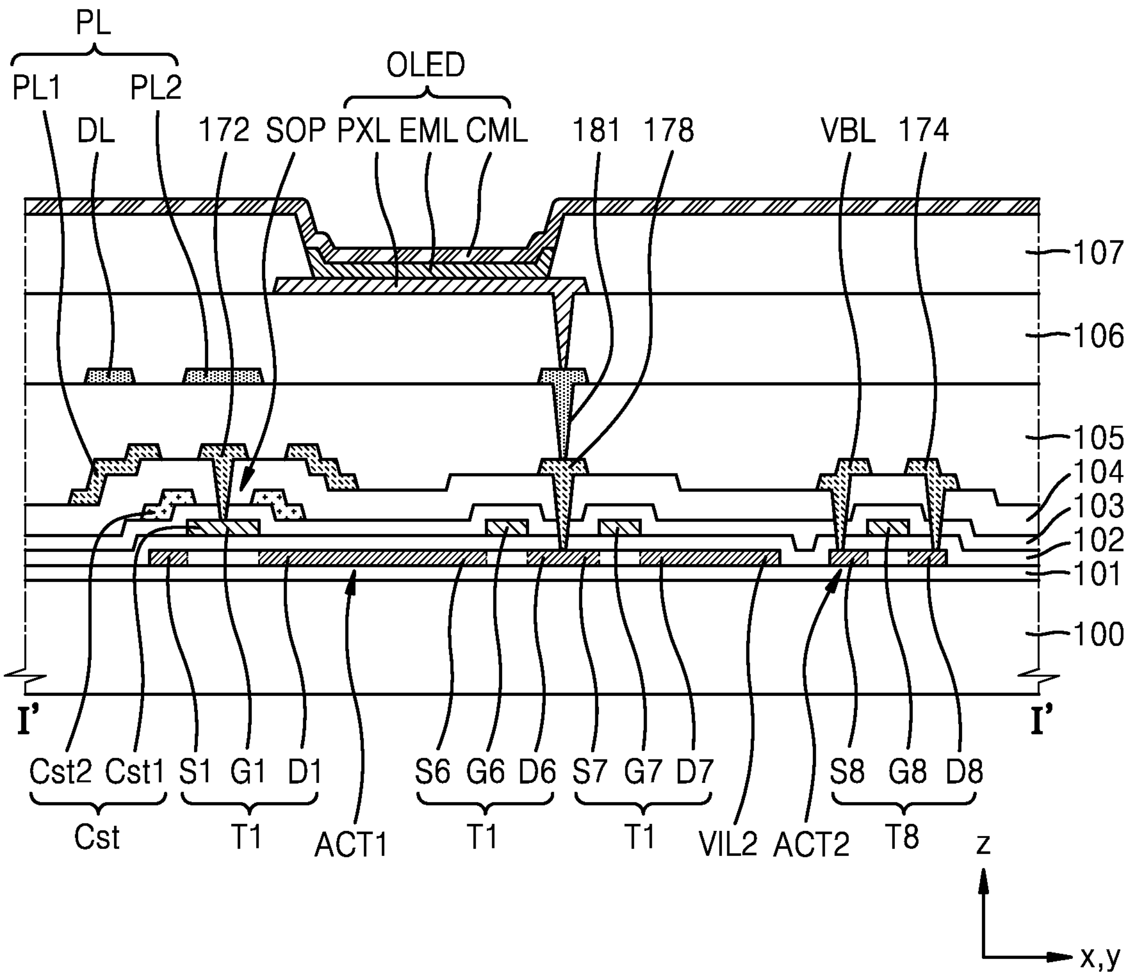
FIG. 6 is a cross-sectional view of a pixel circuit taken along line I-I' of FIG. 5 according to an exemplary embodiment of the present inventive concept.

FIG. 5 is an arrangement view of locations of a plurality of thin film transistors and a capacitor each arranged in a pixel circuit according to an embodiment. FIG. 6 is a cross-sectional view of a pixel circuit taken along line I-I' of FIG. 5. FIG. 5 is an arrangement view corresponding to the pixel circuit of FIG. 3A.

Referring to FIG. 5, the first scan line GWL, the second scan line GIL, the third scan line GCL, the emission control line EL, the first and second initialization voltage lines VIL1 and VIL2, the bias control line EBL, and the bias line VBL each may extend in a first direction (in X direction) and may be arranged on each row. The first scan line GWL, the second scan line GIL, the third scan line GCL, the emission control line EL, the first and second initialization voltage lines VIL1 and VIL2, the bias control line EBL, and the bias line VBL may be spaced apart from each other in a second direction (Y direction) intersecting the first direction. The data line DL may extend in the second direction and be arranged on each column. The driving voltage line PL may include a first driving voltage line PL1 and a second driving voltage line PL2 that are respectively arranged on different layers. The first driving voltage line PL1 extends in the first direction, the second driving voltage line PL2 extends in the second direction, and the first driving voltage line PL1 may be electrically connected to the second driving voltage line PL2.

The first to eighth transistors T1, T2, T3, T4, T5, T6, T7, and T8 each may be implemented as a thin film transistor. Hereinafter, description is made by using the first to eighth thin film transistors T1, T2, T3, T4, T5, T6, T7, and T8.

Hereinafter, description is made with reference to FIG. 6.

A first semiconductor layer ACT1 and a second semiconductor layer ACT2 may be formed over the substrate 100. For example, a buffer layer 101 may be formed on the substrate 100, and the first semiconductor layer ACT1 and the second semiconductor layer ACT2 may be formed on the buffer layer 101. Some areas of the first semiconductor layer ACT1 may constitute semiconductor layers respectively of the first to seventh thin film transistors T1, T2, T3, T4, T5, T6, and T7. The second semiconductor layer ACT2 may constitute a semiconductor layer of the eighth thin film transistor T8.

The substrate 100 may include a glass material, a ceramic material, a metal material, or a flexible or bendable material. In the case where the substrate 100 is flexible or bendable, the substrate 100 may include a polymer resin such as polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), or cellulose acetate propionate (CAP).

The substrate 100 may have a multi-layered structure. For example, the substrate 100 may have a structure in which a first base layer, a first barrier layer, a second base layer, and a second barrier layer are sequentially stacked on each other. The first base layer and the second base layer may include the polymer resin described above. The first barrier layer and the second barrier layer prevent penetration of external foreign substances and may include a single layer or a multi-layer including an inorganic material such as silicon nitride ($SiN_x$) and silicon oxide ($SiO_x$).

The buffer layer 101 may cover a top surface of the substrate 100 and provide a flat surface for a subsequent process. The buffer layer 101 may include an oxide layer including silicon oxide ($SiO_x$) and/or a nitride layer including silicon nitride ($SiN_x$), or silicon oxynitride (SiON).

The first semiconductor layer ACT1 and the second semiconductor layer ACT2 may include low temperature polycrystalline silicon (LTPS). For example, the first semiconductor layer ACT1 and the second semiconductor layer ACT2 may include amorphous silicon (a-Si) and/or an oxide semiconductor, semiconductor layers of some of a plurality of thin film transistors may include LTPS, and semiconductor layers of others may include a-Si and/or an oxide semiconductor layer. The first semiconductor layer ACT1 may include semiconductor layers of the first to seventh thin film transistors T1, T2, T3, T4, T5, T6, and T7. The second semiconductor layer ACT2 may include a semiconductor layer of the eighth thin film transistor T8.

The semiconductor layers of the first to seventh thin film transistors T1, T2, T3, T4, T5, T6, and T7 and the semiconductor layer of the eighth thin film transistor T8 each may include a source area, a drain area, and a channel area, the channel area being between the source area and the drain area. The channel area may include an area overlapping a gate electrode. The channel area may provide an electrical path between the source area and the drain area according to a voltage of the gate electrode. The source area and the drain area may include areas doped with impurities near the channel area. The locations of the source area and the drain area may be switched depending on an embodiment. The source area and the drain area may respectively be a source electrode and a drain electrode of a thin film transistor depending on a case. A gate electrode, a source area, and a drain area shown in FIG. 5 may respectively correspond to the gate terminal, the first terminal, and the second terminal as shown in FIG. 3A.

A source area of a semiconductor layer of the fourth thin film transistor T4, which is a portion of the first semiconductor layer ACT1, may be connected to the first initialization voltage line VIL1. FIG. 5 shows an example in which the first initialization voltage line VIL1 protrudes and extends in the first direction from an end portion of a source area of a semiconductor layer of the fourth thin film transistor T4. A drain area of a semiconductor layer of the seventh thin film transistor T7, which is a portion of the first semiconductor layer ACT1, may be connected to the second initialization voltage line VIL2. FIG. 5 shows an example in which the second initialization voltage line VIL2 protrudes and extends in the first direction from an end portion of a drain area of a semiconductor layer of the seventh thin film transistor T7.

A first gate insulating layer 102 is located (disposed) on the first semiconductor layer ACT1 and the second semiconductor layer ACT2. A gate electrode G1 of the first thin film transistor T1, a gate electrode G2 of the second thin film transistor T2, a gate electrode G3 of the third thin film transistor T3, a gate electrode G4 of the fourth thin film transistor T4, the emission control line EL, and the bias control line EBL may be located on the first gate insulating layer 102.

The first gate insulating layer 102 may include silicon oxide ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

A gate electrode G7 of the seventh thin film transistor T7 may include a portion of the bias control line EBL intersecting a portion of the first semiconductor layer ACT1. A gate electrode G8 of the eighth thin film transistor T8 may include another portion of the bias control line EBL intersecting a portion of the second semiconductor layer ACT2. A gate electrode G5 of the fifth thin film transistor T5 and a gate electrode G6 of the sixth thin film transistor T6 may include portions of the emission control line EL intersecting portions of the first semiconductor layer ACT1.

The gate electrode G1 of the first thin film transistor T1, the gate electrode G2 of the second thin film transistor T2, the gate electrode G3 of the third thin film transistor T3, and the gate electrode G4 of the fourth thin film transistor T4 may overlap the first semiconductor layer ACT1 and be provided as an island type (isolated type). The gate electrode G3 of the third thin film transistor T3 and the gate electrode G4 of the fourth thin film transistor T4 may respectively be bent and overlap the first semiconductor layer ACT1 twice. For example, each of the gate electrode G3 of the third thin film transistor T3 and the gate electrode G4 of the fourth thin film transistor T4 may include a dual gate electrode in which two gate electrodes are arranged on the same layer.

A second gate insulating layer 103 may be provided (disposed) on the gate electrodes of the first to eighth thin film transistors T1, T2, T3, T4, T5, T6, T7, and T8, the emission control line EL, and the bias control line EBL. The second gate insulating layer 103 may include silicon oxide ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

A top electrode (also referred to as a second electrode) Cst2 of the capacitor Cst may be disposed on the second gate insulating layer 103.

The top electrode Cst2 of the capacitor Cst may cover at least a portion of the gate electrode G1 of the first thin film transistor T1 and constitute the capacitor Cst in cooperation with the gate electrode G1 of the first thin film transistor T1. For example, the portion of the gate electrode G1 may serve as an electrode of the capacitor Cst. A bottom electrode (also referred to as a first electrode) Cst1 of the capacitor Cst may be formed as one body together with the gate electrode G1 of the first thin film transistor T1. For example, the gate electrode G1 of the first thin film transistor T1 may serve as the bottom electrode Cst1 of the capacitor Cst. An opening SOP may be formed in the top electrode Cst2 of the capacitor Cst. A first node electrode 172 may electrically connect the bottom electrode Cst1 of the capacitor Cst to a drain area D3 of the third thin film transistor T3 and a drain area D4 of the fourth thin film transistor T4 through the opening SOP.

The top electrode Cst2 of the capacitor Cst may include a single layer or a multi-layer including at least one of aluminum (Al), platinum (Pt), palladium (Pd), silver (Ag), magnesium (Mg), gold (Au), nickel (Ni), neodymium (Nd), iridium (Ir), chrome (Cr), lithium (Li), calcium (Ca), molybdenum (Mo), titanium (Ti), tungsten (W), and copper (Cu).

An interlayer insulating layer 104 is located on the top electrode Cst2 of the capacitor Cst. The interlayer insulating layer 104 may include silicon oxide ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

The first scan line GWL, the second scan line GIL, the third scan line GCL, the first driving voltage line PL1, the bias line VBL, the first and second node electrodes 172 and 174, and connection electrodes 177 and 178 may be arranged on the interlayer insulating layer 104. The first scan line GWL, the second scan line GIL, the third scan line GCL, the first driving voltage line PL1, the bias line VBL, the first and second node electrodes 172 and 174, and the connection electrodes 177 and 178 may include a conductive material including molybdenum (Mo), aluminum (Al), copper (Cu), and titanium (Ti) and include a single layer or a multi-layer including the above materials. For example, the first scan line GWL, the second scan line GIL, the third scan line GCL, the first driving voltage line PL1, the first and second node electrodes 172 and 174, and the connection electrodes 177 and 178 may have a multi-layered structure of Ti/Al/Ti.

The first scan line GWL may extend in the first direction and be electrically connected to the gate electrode G2 of the second thin film transistor T2 through a contact hole formed in the second gate insulating layer 103 and the interlayer insulating layer 104. The first scan line GWL may be bent in some areas.

The second scan line GIL may extend in the first direction and be electrically connected to the gate electrode G4 of the fourth thin film transistor T4 through a contact hole formed in the second gate insulating layer 103 and the interlayer insulating layer 104.

The third scan line GCL may extend in the first direction and be electrically connected to the gate electrode G3 of the third thin film transistor T3 through a contact hole formed in the second gate insulating layer 103 and the interlayer insulating layer 104.

The first driving voltage line PL1 may extend in the first direction and be electrically connected to the top electrode Cst2 of the capacitor Cst through a contact hole formed in the interlayer insulating layer 104. A portion 176 of the first driving voltage line PL1 that protrudes in the second direction may be electrically connected to a source area of the fifth thin film transistor T5 through a contact hole formed in the first gate insulating layer 102, the second gate insulating layer 103, and the interlayer insulating layer 104.

The bias line VBL may extend in the first direction and be electrically connected to a source area S8 of the eighth thin film transistor T8 through a contact hole formed in the first gate insulating layer 102, the second gate insulating layer 103, and the interlayer insulating layer 104.

One end of the first node electrode 172 may be electrically connected to a drain area of the third thin film transistor T3 and a drain area of the fourth thin film transistor T4 through contact holes formed in the first gate insulating layer 102, the second gate insulating layer 103, and the interlayer insulating layer 104. Another end of the first node electrode 172 may be electrically connected to the gate electrode G1 of the first thin film transistor T1 through a contact hole formed in the second gate insulating layer 103 and the interlayer insulating layer 104.

One end of the second node electrode 174 may be electrically connected to a source area S6 of the sixth thin film transistor T6 and a drain area D1 of the first thin film transistor T1 through contact holes formed in the first gate insulating layer 102, the second gate insulating layer 103, and the interlayer insulating layer 104. Another end of the second node electrode 174 may be electrically connected to a drain electrode D8 of the eighth thin film transistor T8 through a contact hole formed in the first gate insulating layer 102, the second gate insulating layer 103, and the interlayer insulating layer 104.

The connection electrode 177 may be electrically connected to a source area of the second thin film transistor T2 through a contact hole formed in the first gate insulating layer 102, the second gate insulating layer 103, and the interlayer insulating layer 104.

The connection electrode 178 may be electrically connected to a drain area of the sixth thin film transistor T6 through a contact hole formed in the first gate insulating layer 102, the second gate insulating layer 103, and the interlayer insulating layer 104.

A first planarization layer 105 may be disposed on the first scan line GWL, the second scan line GIL, the third scan line GCL, the first driving voltage line PL1, the bias line VBL, the first and second node electrodes 172 and 174, and the connection electrodes 177 and 178. The data line DL, the second driving voltage line PL2, and the connection electrode 181 may be arranged on the first planarization layer 105.

The data line DL may be electrically connected to a source area S2 of the second thin film transistor T2 by being electrically connected to the connection electrode 177 through a contact hole formed in the first planarization layer 105.

The second driving voltage line PL2 may be electrically connected to the first driving voltage line PL1 through a contact hole formed in the first planarization layer 105.

The connection electrode 181 may be electrically connected to a drain area D6 of the sixth thin film transistor T6 by being electrically connected to the connection electrode 178 through a contact hole formed in the first planarization layer 105. The connection electrode 181 may be electrically connected to a pixel electrode PXL through a contact hole formed in a second planarization layer 106.

The second planarization layer 106 may be located (disposed) on the data line DL, the second driving voltage line PL2, and the connection electrode 181. The organic light-emitting diode OLED may be located on the second planarization layer 106.

The first planarization layer 105 and the second planarization layer 106 may have a flat surface such that the pixel electrode PXL is formed flat. The first planarization layer 105 and the second planarization layer 106 may include a single layer or a multi-layer including an organic material. The first planarization layer 105 and the second planarization layer 106 may include a general-purpose polymer such as benzocyclobutene (BCB), polyimide, hexamethyldisiloxane (HMDSO), polymethylmethacrylate (PMMA) or polystyrene (PS), polymer derivatives having a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend thereof.

In an embodiment, the first planarization layer 105 and the second planarization layer 106 may include an inorganic material. The first planarization layer 105 and the second planarization layer 106 may include silicon oxide ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). In the case where the first planarization layer 105 and the second planarization layer 106 include an inorganic material, chemical planarization polishing may be performed. In an embodiment, the first planarization layer 105 and the second planarization layer 106 may include both an organic material and an inorganic material.

A pixel-defining layer 107 may be disposed on the second planarization layer 106. The pixel-defining layer 107 may define an emission area of a pixel by including an opening that exposes a portion of the pixel electrode PXL. In addition, the pixel-defining layer 107 may prevent an arc, etc. from occurring at edge of the pixel electrode PXL by increasing a distance between the edge of the pixel electrode PXL and an opposite electrode CML. The pixel-defining layer 107 may include an organic insulating material such as polyimide, polyamide, an acrylic resin, benzocyclobutene, HMDSO, and a phenolic resin.

The organic light-emitting diode OLED may include the pixel electrode PXL, an emission layer EML, and the opposite electrode CML. Though FIG. 6 shows only the emission layer EML, for convenience of description, the organic light-emitting diode OLED may further include a first functional layer and/or a second functional layer on and under the emission layer EML. Though it is shown in FIG. 6 that the emission layer EML is patterned to correspond to the pixel electrode PXL, the emission layer EML, the first functional layer and/or the second functional layer may include a layer patterned to correspond to a plurality of pixel electrodes PXL or a layer which is one body over a plurality of pixel electrodes PXL in an embodiment. The opposite electrode CML may be formed as one body to correspond to a plurality of pixel electrodes PXL.

Though not shown, a thin-film encapsulation layer (not shown) or an encapsulation substrate (not shown) may be arranged on the opposite electrode CML to cover and protect the organic light-emitting diode OLED. The thin-film encapsulation layer (not shown) may cover the display area DA and extend to an outer side of the display area DA. The thin-film encapsulation layer may include an inorganic encapsulation layer and an organic encapsulation layer, the inorganic encapsulation layer including at least one inorganic material, and the organic encapsulation layer including at least one organic material. In an embodiment, the thin-film encapsulation layer may have a structure of a first inorganic encapsulation layer/an organic encapsulation layer/a second inorganic encapsulation layer that are stacked. The encapsulation substrate (not shown) may be arranged to face the substrate 100 and attached to the substrate 100 in the peripheral area PA by using a sealing member such as sealant or frit.

In addition, a spacer may be further provided on the pixel-defining layer 107 to prevent mask stamping (stabbing).

Figure 7:
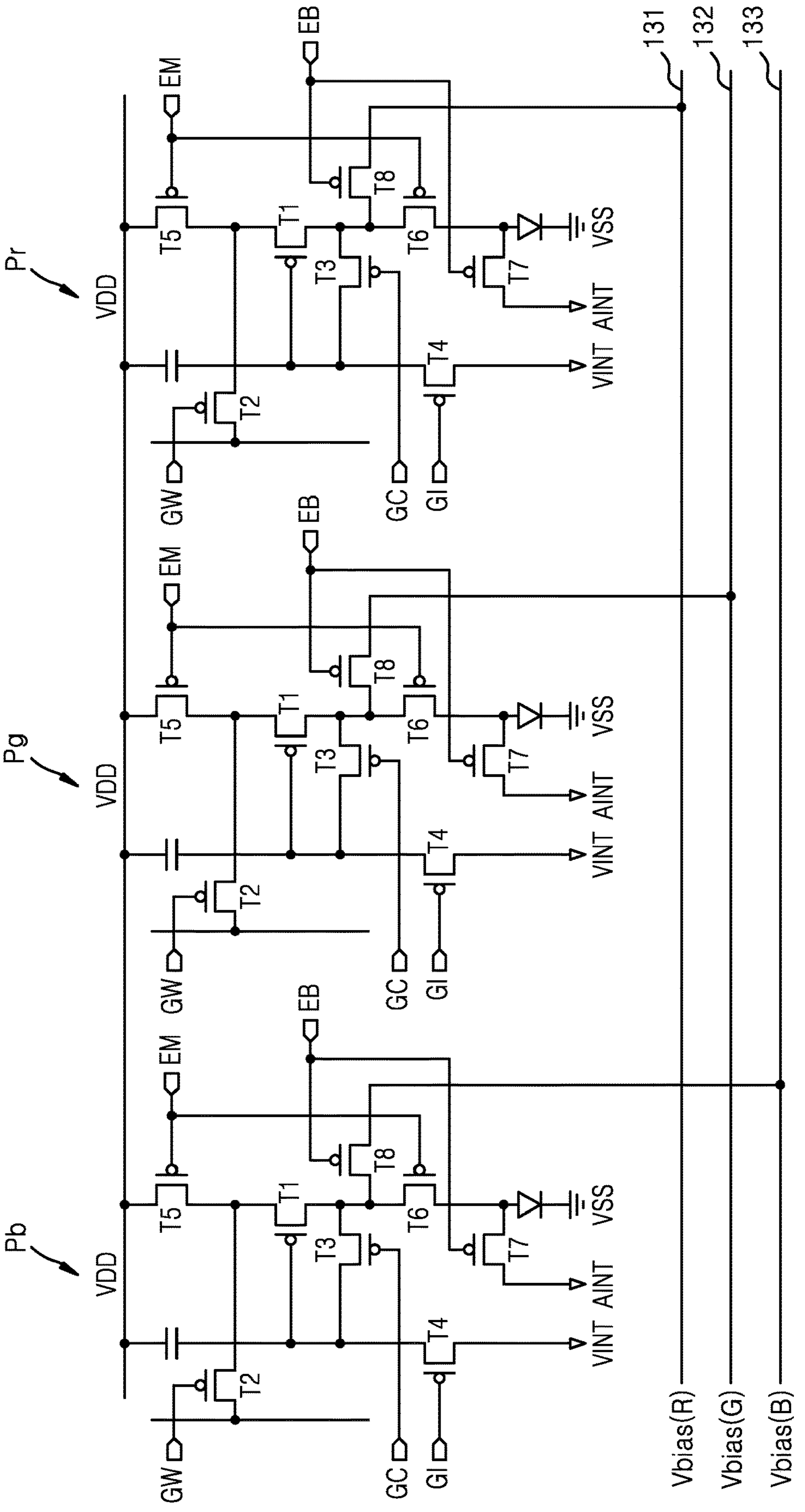
FIG. 7 is a circuit diagram of some pixels according to an exemplary embodiment of the present inventive concept.

FIG. 7 is a circuit diagram of some pixels according to an embodiment.

A plurality of pixels may include a first pixel Pr, a second pixel Pg, and a third pixel Pb respectively emitting light of different colors. In an embodiment, the first pixel Pr may include a red pixel, the second pixel Pg may include a green pixel, and the third pixel Pb may include a blue pixel. However, the present inventive concept is not limited thereto. In an embodiment, a pixel is not limited to the red pixel, the green pixel, and the blue pixel. A pixel may include one of pixels respectively emitting light having red, blue, green, and white colors or include a pixel emitting light having a color other than red, blue, green, or white colors. Hereinafter, the first pixel Pr, the second pixel Pg, and the third pixel Pb arranged in the same row are described as an example.

Referring to FIG. 7, the first pixel Pr, the second pixel Pg, and the third pixel Pb arranged in the same row may share the first scan line GWL, the second scan line GIL, the third scan line GCL, the emission control line EL, the bias control line EBL, the first initialization voltage line VIL1, and the second initialization voltage line VIL2. In contrast, the first pixel Pr, the second pixel Pg, and the third pixel Pb may be connected to different bias lines and may receive bias voltages having different value.

A source electrode of the eighth thin film transistor T8 of the first pixel Pr is connected to a bias line 131. A bias voltage Vbias (R) is supplied through the bias line 131 to the source electrode of the eighth thin film transistor T8 of the first pixel Pr. A source electrode of the eighth thin film transistor T8 of the second pixel Pg is connected to a bias line 132. A bias voltage Vbias (G) is supplied through the bias line 132 to the source electrode of the eighth thin film transistor T8 of the second pixel Pg. A source electrode of the eighth thin film transistor T8 of the third pixel Pb is connected to a bias line 133. A bias voltage Vbias (B) is supplied through the bias line 133 to the source electrode of the eighth thin film transistor T8 of the third pixel Pb.

In an embodiment, as shown in FIG. 7, since the pixels emitting light of different colors are respectively connected to different bias lines, the pixels may receive different bias voltages Vbias. Bias voltages respectively applied to the first pixel Pr, the second pixel Pg, and the third pixel Pb may be set such that "Vbias(R)>Vbias(G)>Vbias(B)". Values of the bias voltages respectively applied to the first pixel Pr, the second pixel Pg, and the third pixel Pb may be set to values that minimize a brightness deviation (a current deviation) among the first pixel Pr, the second pixel Pg, and the third pixel Pb depending on a brightness characteristic of a display panel for each material.

A driving current may be controlled by controlling a source-drain voltage of a driving transistor of each of the first pixel Pr, the second pixel Pg, and the third pixel Pb according to an embodiment shown in FIG. 7. Therefore, color coordinates are adjusted such that the color coordinates are not biased to a specific color when displaying a white color, and a brightness deviation among pixels emitting light of different colors may be minimized.

Figure 8A:
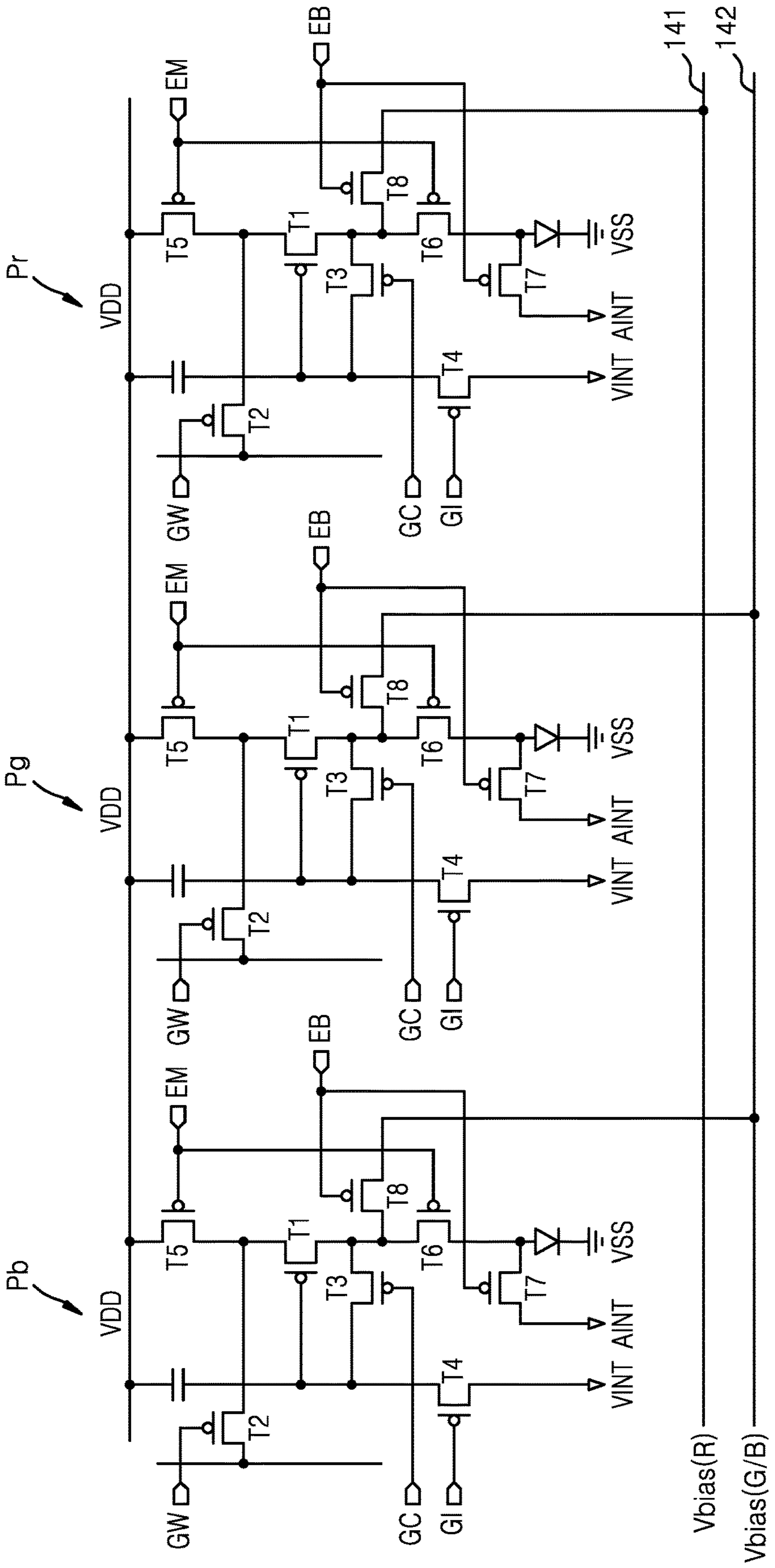
FIGS. 8A to 8C are circuit diagrams of some pixels according to an exemplary embodiment of the present inventive concept.
Figure 8B:
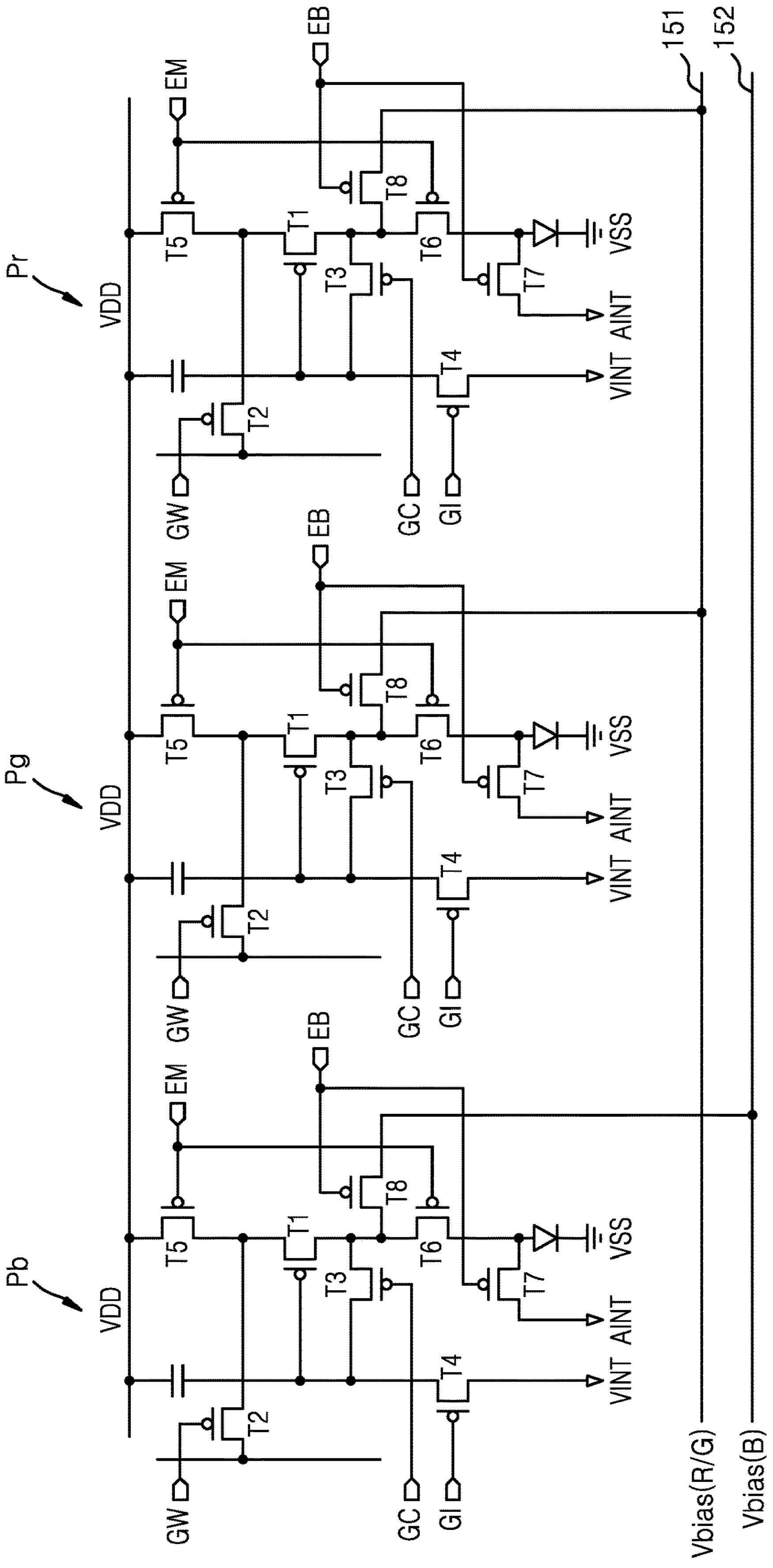
Figure 8C:
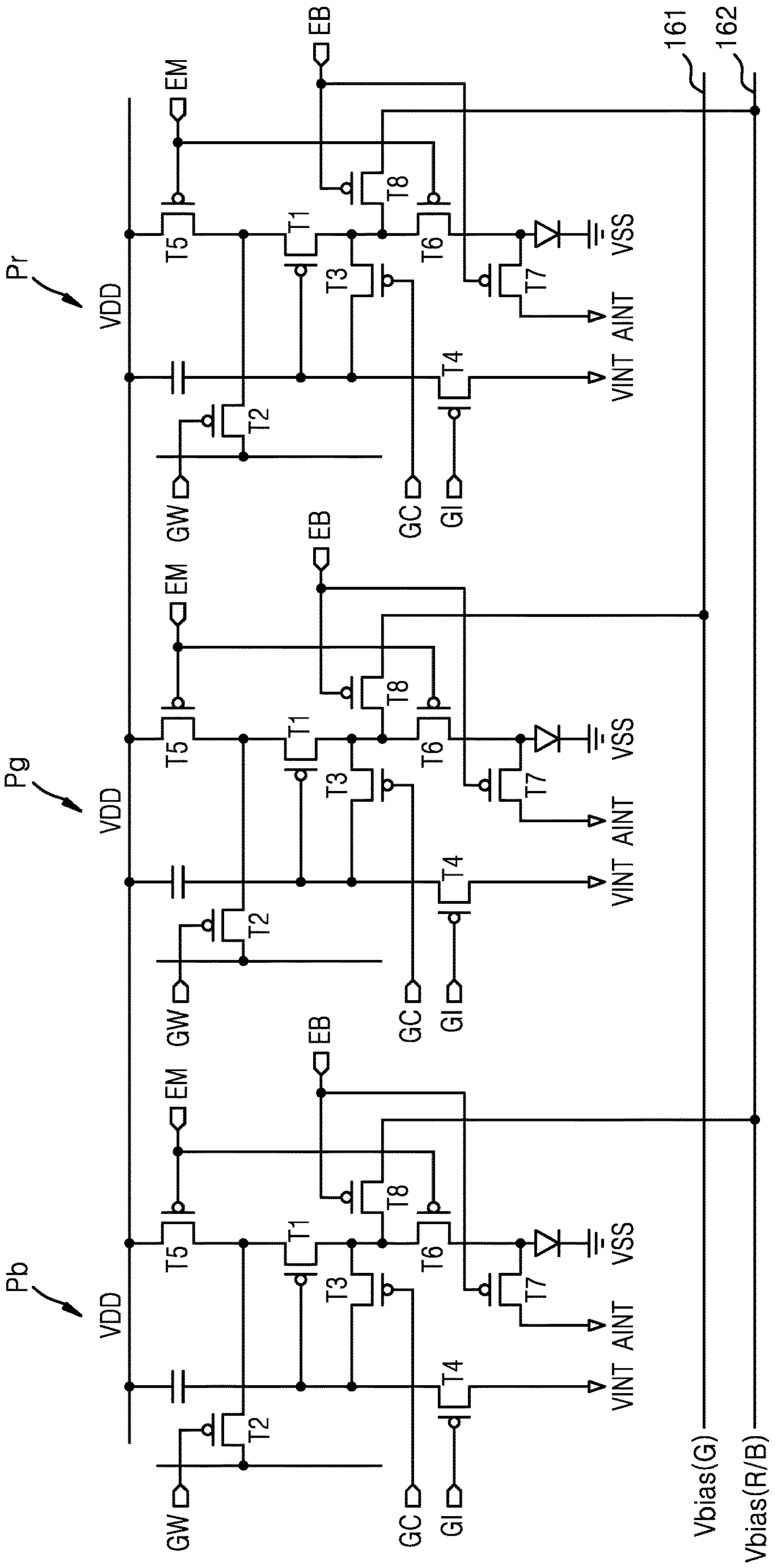
Figure 9:
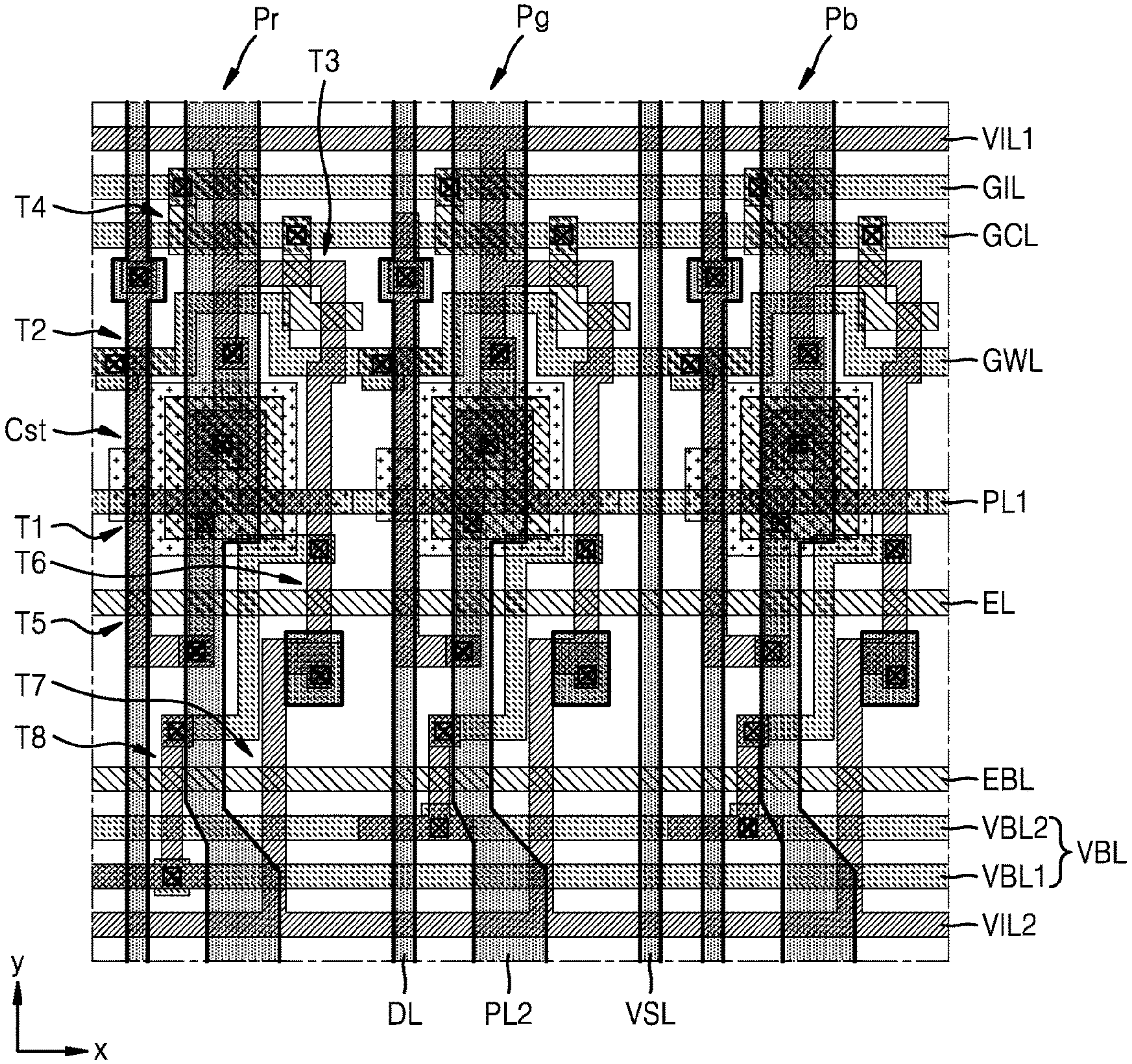
FIG. 9 is an arrangement view of a pixel circuit of pixels corresponding to the circuit diagram of FIG. 8A according to an exemplary embodiment of the present inventive concept.

FIGS. 8A to 8C are circuit diagrams of some pixels according to an embodiment. FIG. 9 is an arrangement view of a pixel circuit of pixels corresponding to the circuit diagram of FIG. 8A.

In an embodiment, the same bias voltage may be applied to two pixels having a similar light-emitting characteristic among the first pixel Pr, the second pixel Pg, and the third pixel Pb. In this case, compared to the embodiment shown in FIG. 7, since bias lines may be reduced to two lines, more layout space may be secured in the second direction.

As shown in FIG. 8A, a source electrode of the eighth thin film transistor T8 of the first pixel Pr may be connected to a bias line 141 configured to apply a bias voltage Vbias (R), and source electrodes of the eighth thin film transistors T8 of the second pixel Pg and the third pixel Pb may be connected, in common, to a bias line 142 configured to apply a bias voltage Vbias (G/B) . Therefore, the same bias voltages Vbias (G/B) may be applied to the second pixel Pg and the third pixel Pb.

Alternatively, as shown in FIG. 8B, source electrodes of the eighth thin film transistors T8 of the first pixel Pr and the second pixel Pg may be connected, in common, to a bias line 151 configured to apply a bias voltage Vbias (R/G), and a source electrode of the eighth thin film transistor T8 of the third pixel Pb may be connected to a bias line 152 configured to apply a bias voltage Vbias (B). Therefore, the same bias voltage Vbias (R/G) may be applied to the first pixel Pr and the second pixel Pg.

Alternatively, as shown in FIG. 8C, source electrodes of the eighth thin film transistors T8 of the first pixel Pr and the third pixel Pb may be connected, in common, to a bias line 162 configured to apply a bias voltage Vbias (R/B), and a source electrode of the eighth thin film transistor T8 of the second pixel Pg may be connected to a bias line 161 configured to apply a bias voltage Vbias (G). Therefore, the same bias voltage Vbias (R/B) may be applied to the first pixel Pr and the third pixel Pb.

Referring to FIG. 9, a first bias line VBL1 and a second bias line VBL2 may extend between the bias control line EBL and the second initialization voltage line VIL2, the first bias line VBL1 being connected to the first pixel Pr, and the second bias line VBL2 being connected to the second pixel Pg and the third pixel Pb. The first bias line VBL1 and the second bias line VBL2 may include the same material on the same layer and may be spaced apart from each other. In an embodiment, a common voltage line VSL to which the common voltage VSS is applied may be further arranged in the first direction with a predetermined interval in the display area DA. The common voltage line VSL may extend in the second direction, include the same material as the data line DL, and may be arranged on the same layer as the data line DL. FIG. 9 shows an example in which the common voltage line VSL is arranged between a pixel circuit of the second pixel Pg and a pixel circuit of the third pixel Pb. The common voltage line VSL may be electrically connected to the opposite electrode CML. Since other configurations are the same as those of the embodiment shown in FIG. 5, detailed descriptions thereof are omitted.

Figure 10:
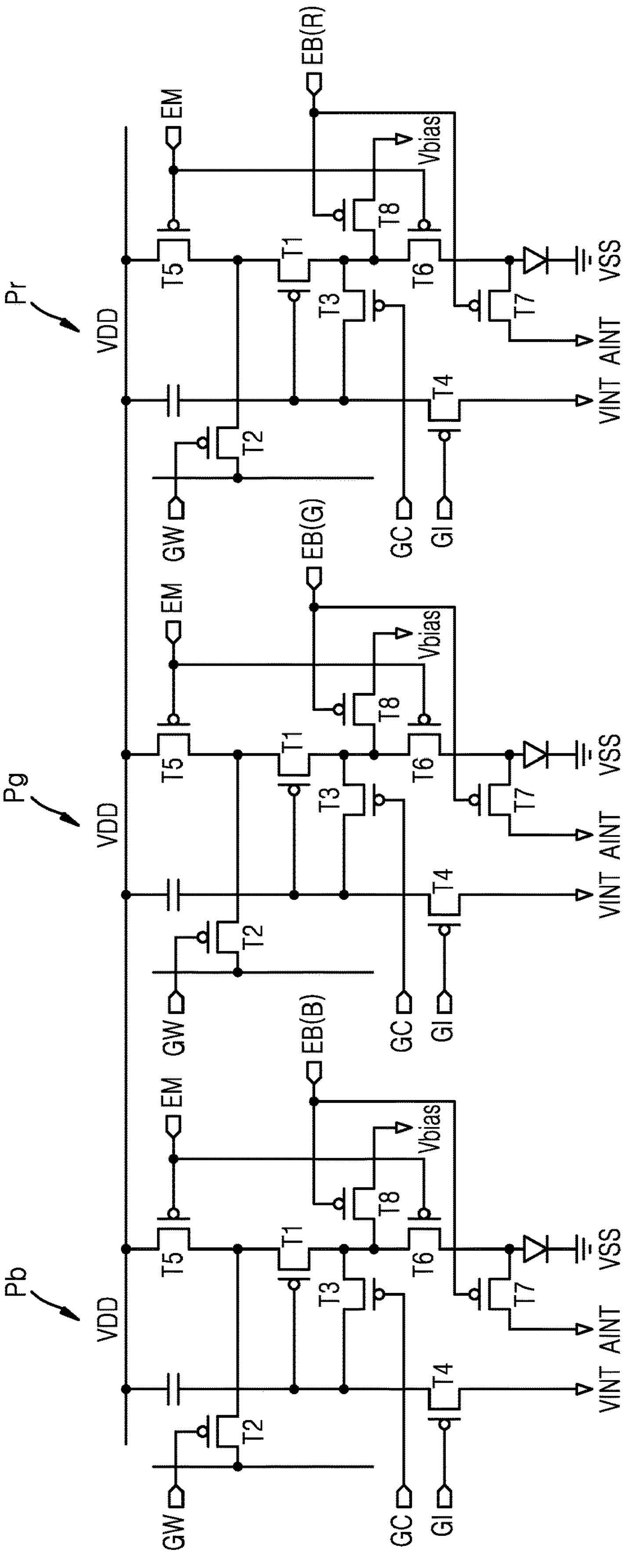
FIG. 10 is a circuit diagram of some pixels according to an exemplary embodiment of the present inventive concept.
Figure 11:
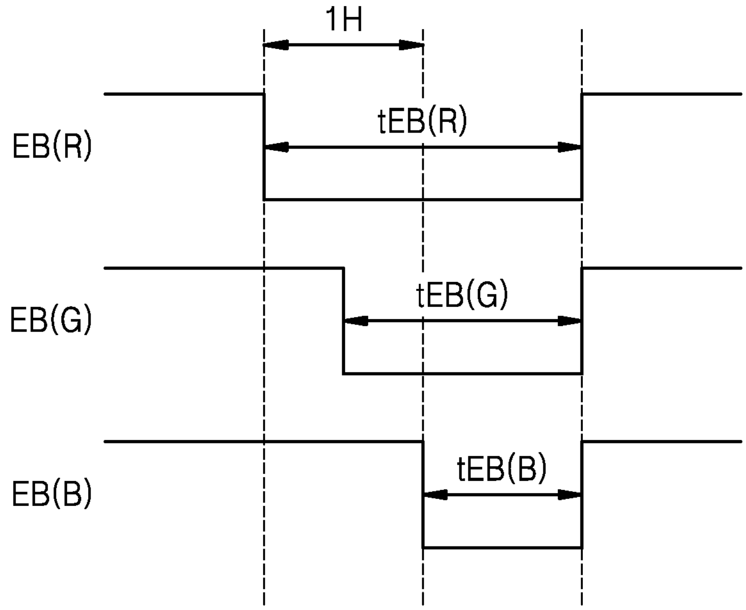
FIG. 11 is a timing diagram of an application time of a bias control signal of an eighth thin film transistor for each pixel according to an exemplary embodiment of the present inventive concept.

FIG. 10 is a circuit diagram of some pixels according to an embodiment. FIG. 11 is a timing diagram of an application time of a bias control signal of an eighth thin film transistor for each pixel.

Referring to FIG. 10, the first pixel Pr, the second pixel Pg, and the third pixel Pb arranged in the same row may share the first scan line GWL, the second scan line GIL, the third scan line GCL, the emission control line EL, the first initialization voltage line VIL1, the second initialization voltage line VIL2, and the bias line VBL. In contrast, the first pixel Pr, the second pixel Pg, and the third pixel Pb may be connected to different bias lines and may receive bias control signals having different values.

Referring to FIGS. 10 and 11, in an embodiment, a time for which an on-voltage of a bias control signal EB is applied to a gate electrode of the eighth thin film transistor T8, that is, a time for which a bias control signal EB of a low level is applied may be set different for pixels emitting light of different colors. For example, on-voltage application times of bias control signals respectively applied to the first pixel Pr, the second pixel Pg, and the third pixel Pb may be set such that "tEB(R)>tEB(G)>tEB(B)". In this case, a bias control line EBL connected to the first pixel Pr, a bias control line EBL connected to the second pixel Pg, and a bias control line EBL connected to the third pixel Pb may be respectively provided. On-voltage application times of bias control signals respectively applied to the first pixel Pr, the second pixel Pg, and the third pixel Pb may be set to values that minimize a brightness deviation (a current deviation) among the first pixel Pr, the second pixel Pg, and the third pixel Pb depending on a brightness characteristic of a display panel for each material.

In the embodiment shown in FIG. 10, the driving current may be controlled by controlling an application time of a bias voltage to the source electrode or the drain electrode of the driving transistor and thus controlling a source-drain voltage of the driving transistor. Therefore, color coordinates are adjusted such that the color coordinates are not biased to a specific color when displaying a white color, and a brightness deviation (a current deviation) between pixels emitting light of different colors may be minimized.

Figure 12:
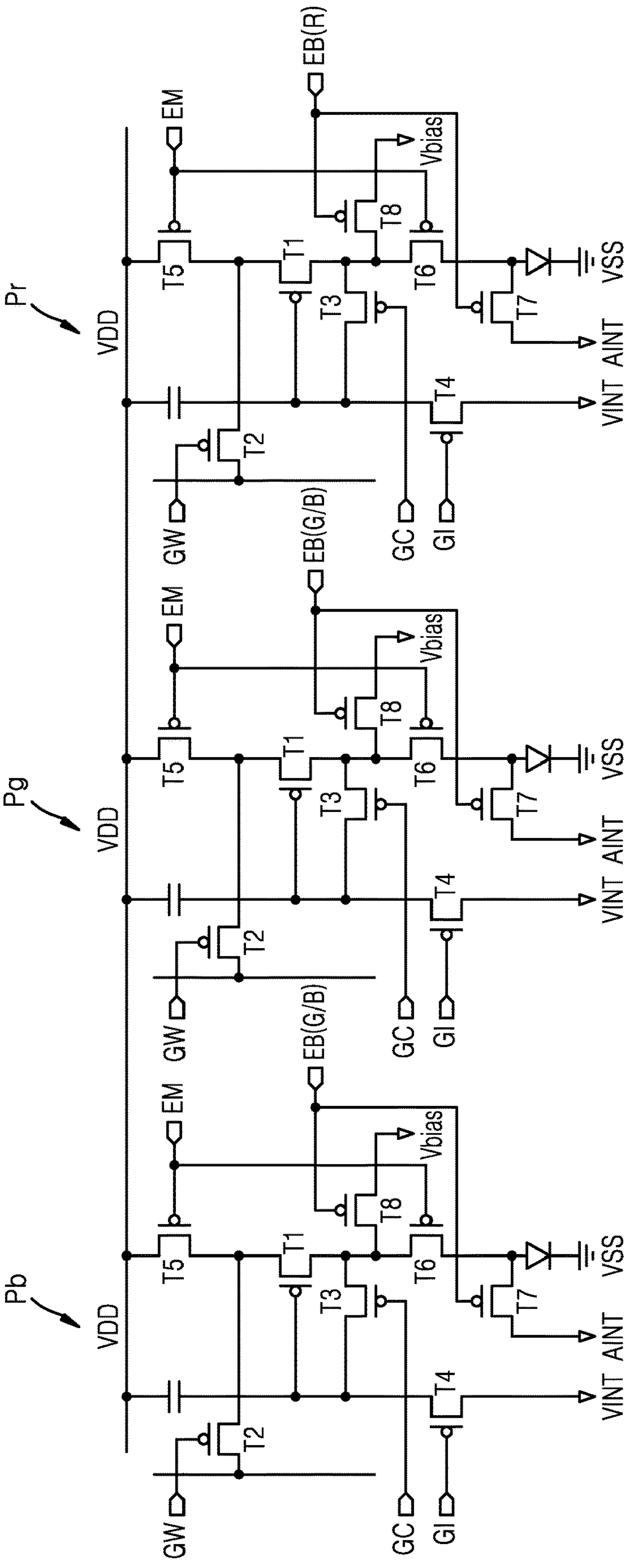
FIG. 12 is a circuit diagram of some pixels according to an exemplary embodiment of the present inventive concept.
Figure 13A:
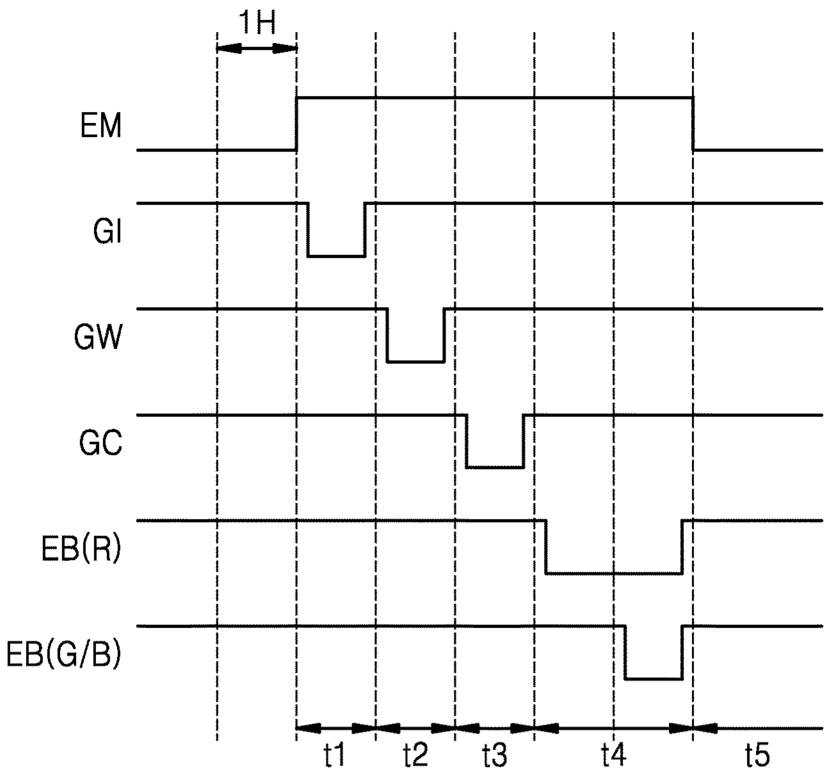
FIGS. 13A and 13B are timing diagrams of an application time of a bias control signal of an eighth thin film transistor for each pixel according to an exemplary embodiment of the present inventive concept.
Figure 13B:
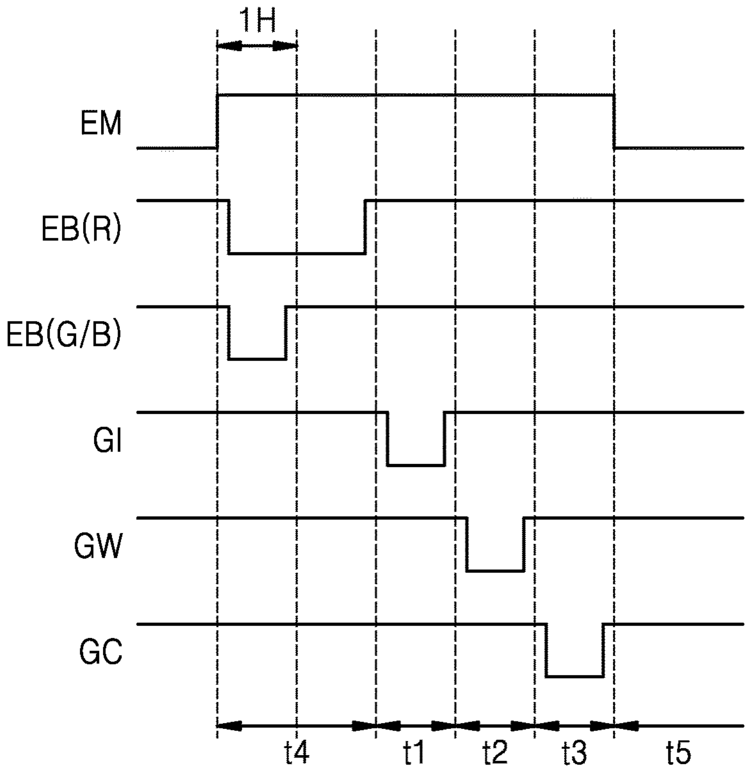
Figure 14:
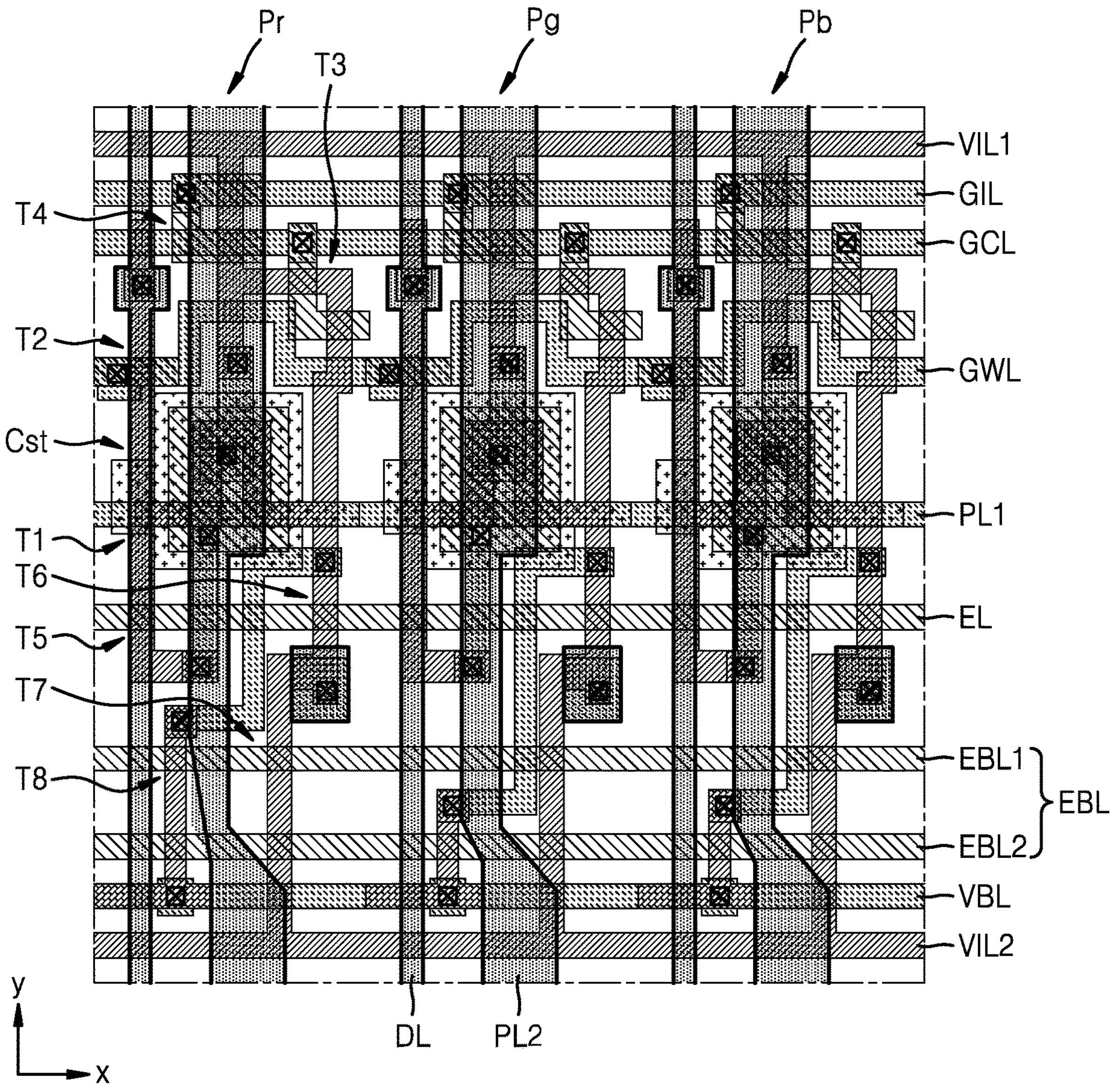
FIG. 14 is an arrangement view of a pixel circuit of pixels to which the timing diagram of FIG. 13A is applied according to an exemplary embodiment of the present inventive concept.

FIG. 12 is a circuit diagram of some pixels according to an embodiment. FIGS. 13A and 13B are timing diagrams of an application time of a bias control signal of an eighth thin film transistor for each pixel. FIG. 14 is an arrangement view of a pixel circuit of pixels to which the timing diagram of FIG. 13A is applied.

In an embodiment, the same on-voltage application time of a bias control signal may be set to two pixels having a similar light-emitting characteristic among the first pixel Pr, the second pixel Pg, and the third pixel Pb. For example, as shown in FIGS. 12, 13A, and 13B, an on-voltage application time of a bias control signal EB applied to the second pixel Pg and the third pixel Pb is equally set to 1 H, and an on-voltage application time of a bias control signal EB applied to the first pixel Pr is set to 2H such that the on-voltage application time of a bias control signal EB applied to the first pixel Pr is twice longer than the on-voltage application time of a bias control signal EB applied to the second pixel Pg and the third pixel Pb. In this case, as shown in FIG. 14, compared to the embodiment of FIG. 11 in which three bias control lines are required, bias control lines may be reduced to two lines and accordingly more layout space may be secured in the second direction.

In an embodiment, an on-voltage application time of a bias control signal EB applied to the first pixel Pr and the second pixel Pg may be set to the same value, and an on-voltage application time of a bias control signal EB applied to the third pixel Pb may be set different from the on-voltage application time of a bias control signal EB applied to the first pixel Pr and the second pixel Pg. In an embodiment, an on-voltage application time of a bias control signal EB applied to the first pixel Pr and the third pixel Pb may be set to the same value, and an on-voltage application time of a bias control signal EB applied to the second pixel Pg may be set different from the on-voltage application time of a bias control signal EB applied to the first pixel Pr and the third pixel Pb.

FIG. 13A shows an embodiment in which the fourth period t4 during which a bias control signal EB is applied is between the third period t3 and the fifth period t5 and FIG. 13B shows an embodiment in which the fourth period t4 during which a bias control signal EB is applied precedes the first period t1.

Referring to FIG. 14, a first bias control line EBL1 and a second bias control line EBL2 may extend in the first direction between the emission control line EL and the bias line VBL. A semiconductor layer of the eighth thin film transistor T8 of the first pixel Pr overlaps the first bias control line EBL1 and the second bias control line EBL2, and semiconductor layers of the eighth thin film transistors T8 of the second pixel Pg and the third pixel Pb overlap the second bias control line EBL2. In an embodiment, the eighth thin film transistor T8 of the first pixel Pr may include a thin film transistor having a double-gate structure in which two thin film transistors are series-connected and two gate electrodes are arranged on the same layer. Since other configurations are the same as those of the embodiment shown in FIG. 5, detailed descriptions thereof are omitted. The first bias control line EBL1 and the second bias control line EBL2 may include the same material on the same layer and be spaced apart from each other.

Figure 15:
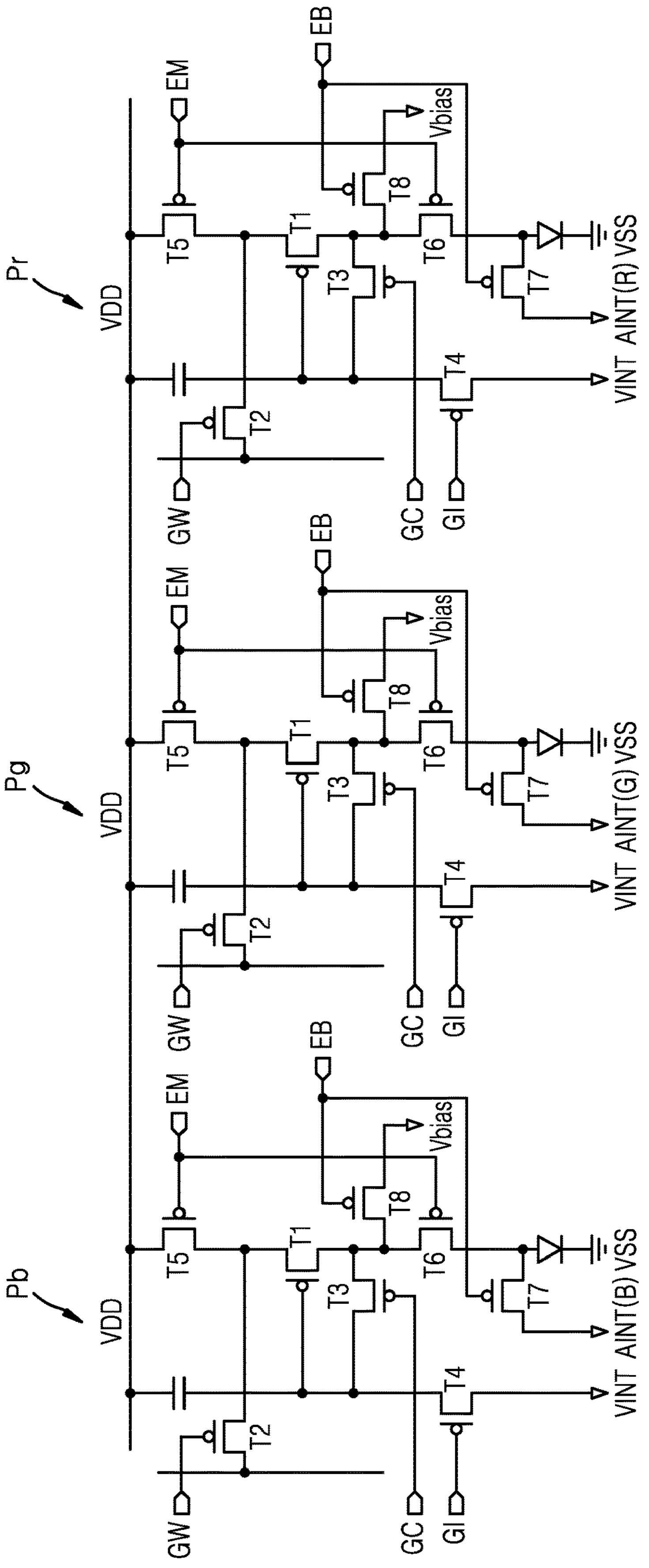
FIGS. 15 and 16 are circuit diagrams of some pixels according to an exemplary embodiment of the present inventive concept.
Figure 16:
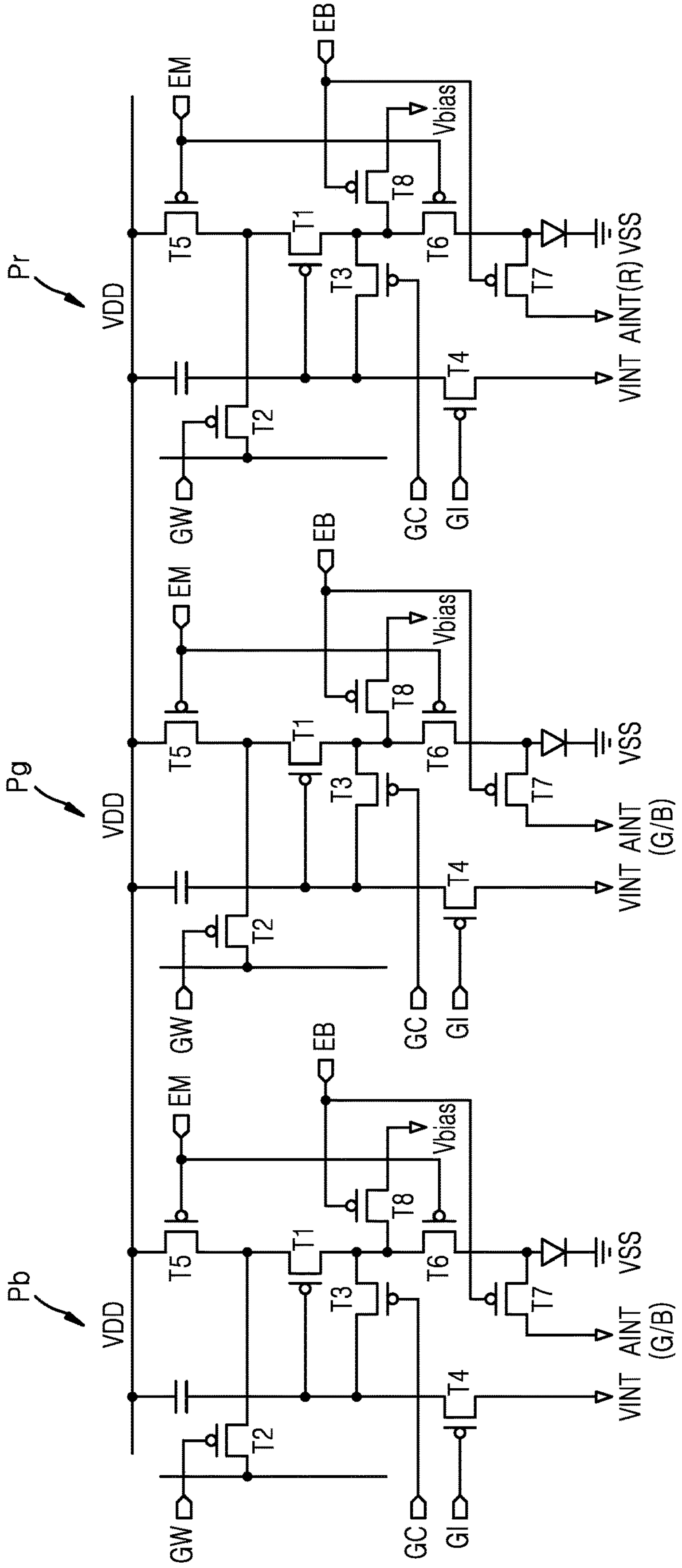
Figure 17:
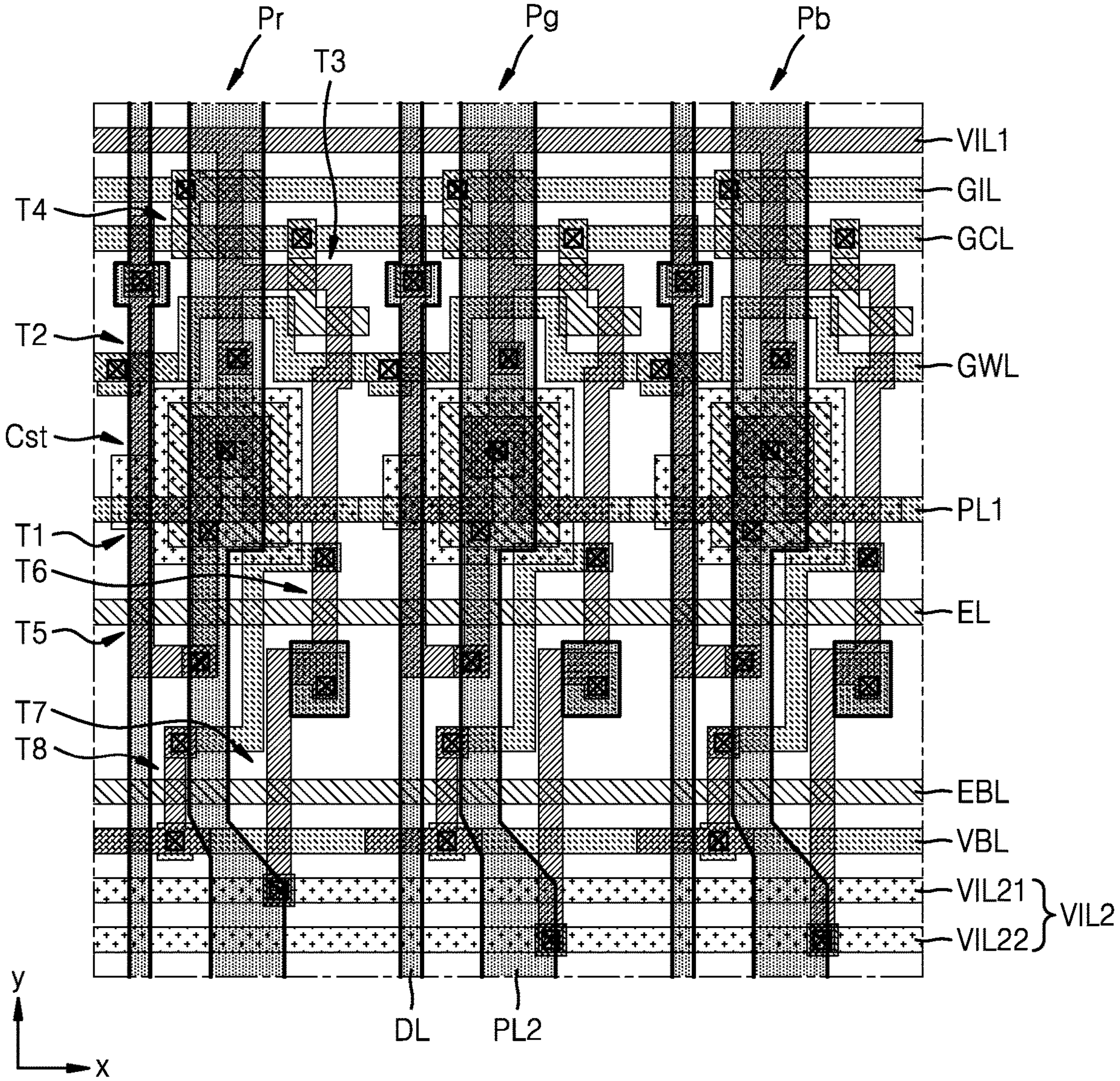
FIG. 17 is an arrangement view of a pixel circuit of pixels corresponding to the circuit diagram of FIG. 16 according to an exemplary embodiment of the present inventive concept.

FIGS. 15 and 16 are circuit diagrams of some pixels according to an embodiment. FIG. 17 is an arrangement view of a pixel circuit of pixels corresponding to the circuit diagram of FIG. 16.

Referring to FIG. 15, the first pixel Pr, the second pixel Pg, and the third pixel Pb arranged in the same row may share the first scan line GWL, the second scan line GIL, the third scan line GCL, the emission control line EL, the bias control line EBL, the first initialization voltage line VIL1, and the bias line VBL. In contrast, the first pixel Pr, the second pixel Pg, and the third pixel Pb may be connected to different second initialization voltage lines and may receive second initialization voltages having different values.

Referring to FIG. 15, in an embodiment, a time for which the second initialization voltage AINT is applied to a source electrode of the seventh thin film transistor T7 may be set different for pixels emitting light of different colors. For example, a second initialization voltage AINT(R) applied to the first pixel Pr, a second initialization voltage AINT(G) applied to the second pixel Pg, and a second initialization voltage AINT(B) applied to the third pixel Pb may be different from one another. In this case, a second initialization voltage line VIL2 connected to the first pixel Pr, a second initialization voltage line VIL2 connected to the second pixel Pg, and a second initialization voltage line VIL2 connected to the third pixel Pb may be provided separately. The values of the second initialization voltages AINT(R), AINT(G), and AINT(B) applied to the first pixel Pr, the second pixel Pg, and the third pixel Pb may be set to values that minimize a brightness deviation (a current deviation) among the first pixel Pr, the second pixel Pg, and the third pixel Pb depending on a brightness characteristic of a display panel for each material.

In an embodiment shown in FIG. 15, the amount of a current flowing through an organic light-emitting diode OLED may be controlled by controlling a voltage of a pixel electrode of the organic light-emitting diode OLED for each pixel before emitting light and thus controlling a charging speed of a capacitance of the organic light-emitting diode OLED while emitting light. Therefore, color coordinates may be adjusted and a brightness deviation (a current deviation) among pixels emitting light of different colors may be minimized with the color coordinates not biased to a specific color while displaying a white color.

In an embodiment, the second initialization voltages applied to two pixels having a similar light-emitting characteristic among the first pixel Pr, the second pixel Pg, and the third pixel Pb may be set to the same value. For example, as shown in FIGS. 16 and 17, the second initialization voltages AINT(G/B) applied to the second pixel Pg and the third pixel Pb may be set to the same value. In this case, compared to the embodiment of FIG. 15 that requires three second initialization voltage lines for each row, the second initialization voltage lines may be reduced to two lines and thus more layout space may be secured in the second direction. In an embodiment, the second initialization voltages applied to the first pixel Pr and the second pixel Pg may be set to the same value, and the second initialization voltage applied to the third pixel Pb may be set different from the second initialization voltage applied to the first pixel Pr and the second pixel Pg. In an embodiment, the second initialization voltages applied to the first pixel Pr and the third pixel Pb may be set to the same value, and the second initialization voltage applied to the second pixel Pg may be set different from the second initialization voltages applied to the first pixel Pr and the third pixel Pb.

Referring to FIG. 17, a (2-1)st initialization voltage line VIL21 and a (2-2)nd initialization voltage line VIL22 may extend in the first direction. A source area of the seventh thin film transistor T7 of the first pixel Pr may be connected to the (2-1)st initialization voltage line VIL21, and source areas of the seventh thin film transistors T7 of the second pixel Pg and the third pixel Pb may be connected to the (2-2)nd initialization voltage line VIL22.

The (2-1)st initialization voltage line VIL21 and the (2-2)nd initialization voltage line VIL22 may be spaced apart from each other on the same layer. The (2-1)st initialization voltage line VIL21 and the (2-2)nd initialization voltage line VIL22 may include the same material as the second electrode Cst2 of the capacitor Cst and may be arranged on the same layer on which the second electrode Cst2 of the capacitor Cst is arranged. Since other configurations are the same as those of the embodiment of FIG. 5, detailed descriptions thereof are omitted.

Though not shown in FIGS. 14 and 17, in the arrangement views of FIGS. 14 and 17, the common voltage line VSL through which the common voltage VSS is applied to the display area DA may be further arranged with a predetermined interval in the first direction as shown in FIG. 9.

Figure 18:
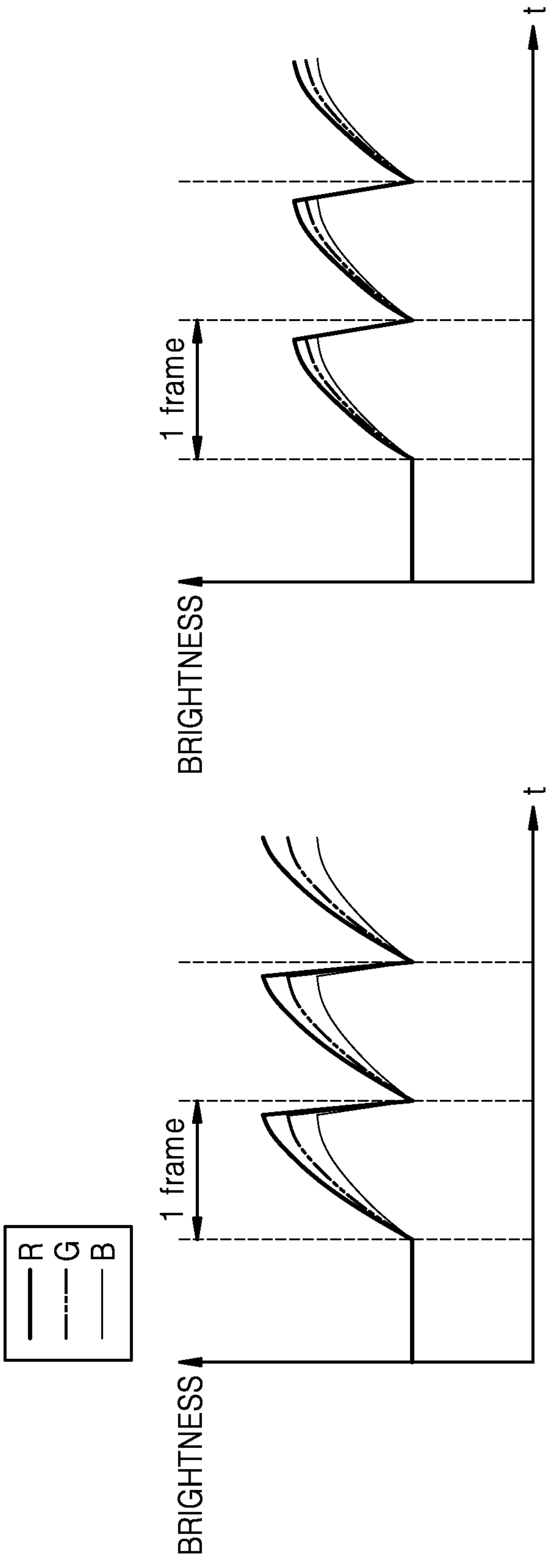
FIG. 18 is a view showing an effect according to an exemplary embodiment of the present inventive concept.

FIG. 18 is a view showing an effect according to an embodiment. FIG. 18 has two graphs of brightness with respect to time.

The graph on the right side of FIG. 18 shows a brightness of the first pixel Pr, the second pixel Pg, and the third pixel Pb according to an embodiment in which at least one of a bias voltage, an on-voltage application time of a bias control signal, and a second initialization voltage applied to the first pixel Pr, the second pixel Pg, and the third pixel Pb is applied differently for each of the first pixel Pr, the second pixel Pg, and the third pixel Pb.

The graph on the left side of FIG. 18 shows a brightness of the first pixel Pr, the second pixel Pg, and the third pixel Pb according to a comparative example in which a bias voltage, an on-voltage application time of a bias control signal, and a second initialization voltage applied to the first pixel Pr, the second pixel Pg, and the third pixel Pb are the same.

As shown in FIG. 18, compared to the comparative example, when the first pixel Pr, the second pixel Pg, and the third pixel Pb are controlled according to an embodiment of the present invention, a brightness deviation among them is reduced.

Figure 19:
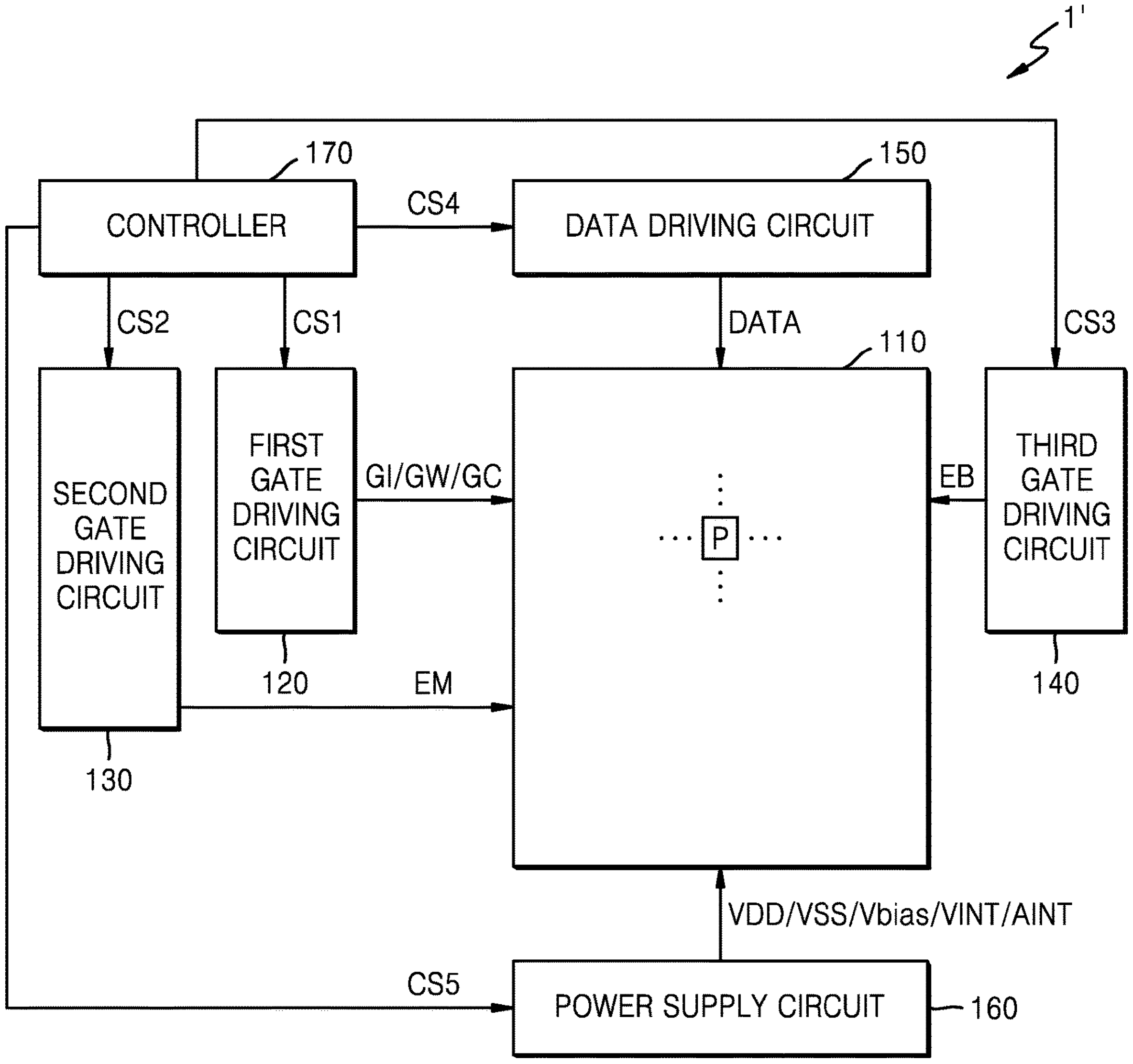
FIG. 19 is a view of a display device according to an exemplary embodiment of the present inventive concept.

FIG. 19 is a view of a display device 1' according to an embodiment.

Referring to FIG. 19, the display device 1' according to an embodiment may include a pixel unit 110, a first gate driving circuit 120, a second gate driving circuit 130, a third gate driving circuit 140, a data driving circuit 150, a power supplying circuit 160, and a controller 170.

A plurality of pixels P may be arranged in the pixel unit 110. The plurality of pixels P may be arranged in various configurations such as a stripe arrangement, a pentile arrangement, and a mosaic arrangement to display an image. The pixel unit 110 may correspond to the display area DA of the substrate 100 shown in FIG. 2. As shown in FIGS. 3A to 3C, each pixel P may include an organic light-emitting diode OLED as a display element, and the organic light-emitting diode OLED may be connected to a pixel circuit. Each pixel P may emit, for example, red, green, blue, or white light from the organic light-emitting diode OLED.

A plurality of first to third scan lines, a plurality of emission control lines, a plurality of bias control lines may be spaced apart from each other and arranged on a row in the pixel unit 110. A plurality of first scan lines may be configured to transfer first scan signals GW to corresponding pixels P, respectively. A plurality of second scan lines may be configured to transfer second scan signals GI to corresponding pixels P, respectively. A plurality of third scan lines may be configured to transfer third scan signals GC to corresponding pixels P, respectively. A plurality of emission control lines may be configured to transfer emission control signals EM to corresponding pixels P, respectively. A plurality of bias control lines may be configured to transfer bias control signals EB to corresponding pixels P, respectively. A plurality of data lines may be spaced apart from each other with a predetermined interval and arranged on a column in the pixel unit 110 and configured to transfer data signals DATA to corresponding pixels P, respectively.

The first gate driving circuit 120 may be connected to the plurality of first to third scan lines of the pixel unit 110 and configured to apply first to third scan signals GW, GI, and GC to first to third scan lines, respectively, according to a first control signal CS1. In the case where the first to third scan signals GW, GI, and GC have an on-voltage, a transistor of a pixel P connected to a corresponding scan line is turned on.

The second gate driving circuit 130 may be connected to a plurality of emission control lines of the pixel unit 110 and configured to transfer an emission control signal EM to the emission control lines according to a second control signal CS2.

The third gate driving circuit 140 may be connected to a plurality of bias control lines of the pixel unit 110 and configured to apply a bias control signal EB to the bias control lines according to a third control signal CS3. The third gate driving circuit 140 may be configured to apply different bias control signals EB to pixels emitting light of different colors. An on-voltage application time of a bias control signal EB for each pixel may be set to a value that minimizes a brightness deviation (a current deviation) for each pixel depending on a material (e.g. materials of a transistor and an organic light-emitting diode) of a display panel.

The data driving circuit 150 may be connected to a plurality of data lines of the pixel unit 110 and configured to apply a data signal DATA to the data lines according to a fourth control signal CS4, the data signal DATA representing a pixel value of a grayscale image. The pixel value may represent the brightness of a pixel. The data driving circuit

150 may convert input image data into a data signal in the form of a voltage or a current, the image data having a grayscale and being input from the controller 170.

The power supply circuit 160 may generate various voltages such as the driving voltage VDD, the common voltage VSS, the bias voltage Vbias, the first initialization voltage VINT, and the second initialization voltage AINT. The power supply circuit 160 may be configured to apply the driving voltage VDD, the common voltage VSS, the bias voltage Vbias, the first initialization voltage VINT, and the second initialization voltage AINT to the pixels P of the pixel unit 110, the driving voltage VDD, the common voltage VSS, the bias voltage Vbias, the first initialization voltage VINT, and the second initialization voltage AINT being generated according to a fifth control signal CS5. The power supply circuit 160 may be configured to apply different bias voltages Vbias and/or different second initialization voltages AINT to pixels emitting light of different colors. Values of the bias voltage Vbias and the second initialization voltage AINT for each pixel may be set to values that minimize a brightness deviation (a current deviation) for each pixel depending on a material (e.g. materials of a transistor and an organic light-emitting diode) of a display panel.

The controller 170 may be configured to receive input image data and an input control signal controlling displaying of the input image data from an external graphic controller (not shown). The input control signal may include, for example, a vertical synchronization signal Vsync, a horizontal synchronization signal Hsync, and a main clock MCLK. The controller 170 may generate first to fifth control signals CS1, CS2, CS3, CS4, and CS5 according to a vertical synchronization signal Vsync, a horizontal synchronization signal Hsync, and a main clock signal MCLK and be configured to transfer the same to the first gate driving circuit 120, the second gate driving circuit 130, the third gate driving circuit 140, the data driving circuit 150, and the power supply circuit 160.

The first gate driving circuit 120, the second gate driving circuit 130, and the third gate driving circuit 140 may include an implemented example of the scan driver 1100 as shown in FIG. 2. The data driving circuit 150 may be an implemented example of the data driver 1200 as shown in FIG. 2. The first gate driving circuit 120, the second gate driving circuit 130, the third gate driving circuit 140, the data driving circuit 150, the power supply circuit 160, and the controller 170 may be respectively formed in the form of separate integrated circuit chips or formed in the form of one integrated circuit chip and directly mounted on a substrate on which the pixel unit 110 is formed, mounted on a flexible printed circuit film, attached in the form of a tape carrier package (TCP) on a substrate, or directly formed on a substrate.

Embodiments may provide a display device in which a current deviation for each pixel may be minimized and white balance distortion may be minimized by differently compensating for a characteristic of a driving transistor and a characteristic of a light-emitting diode for respective pixels emitting light of different colors.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device including a plurality of pixels, wherein each of the plurality of pixels, including:

a light-emitting diode;

a driving transistor including a gate electrode, a first electrode connected to a node, and a second electrode connected to the light-emitting diode;

a first transistor connected between a data line and the node;

a second transistor connected between the gate electrode of the driving transistor and the second electrode of the driving transistor and configured to connect the gate electrode of the driving transistor to the second electrode of the driving transistor; and a third transistor connected between a pixel electrode of the light-emitting diode and a voltage line, wherein the voltage line comprises a first voltage line and a second voltage line, wherein the first voltage line is connected to the third transistor of a first pixel emitting light of a first color among the plurality of pixels, and the second voltage line is connected to the third transistor of a second pixel emitting light of a second color among the plurality of pixels, wherein a voltage supplied through the first voltage line is different from a voltage supplied through the second voltage line, and wherein the display device further comprising a common voltage line between two pixels of the plurality of pixels and connected to an opposite electrode of the light-emitting diode.

2. The display device of claim 1, wherein the data line is extended in a first direction, and the first voltage line and the second voltage line are extended in a second direction perpendicular to the first direction.

3. The display device of claim 1, wherein each of the plurality of pixels further includes:

a fourth transistor connected between the gate electrode of the driving transistor and a third voltage line.

4. The display device of claim 3, wherein a frame comprises a data write period during which data signal is supplied through the data line, a first period before the data write period and a second period after the data write period, and wherein the first transistor is turned on in the data write period, the fourth transistor is turned on in the first period and the third transistor is turned on in the second period.

5. The display device of claim 3, wherein a frame comprises a data write period during which data signal is supplied through the data line, a first period before the data write period and a second period before the first period, and wherein the first transistor is turned on in the data write period, the fourth transistor is turned on in the first period and the third transistor is turned on in the second period.

6. The display device of claim 3, wherein a frame comprises a data write period during which data signal is supplied through the data line, a first period before the data write period, a second period after the data write period, and a third period between the data write period and the second period, and wherein the first transistor is turned on in the data write period, the fourth transistor is turned on in the first period, the third transistor is turned on in the second period, and the second transistor is turned on in the third period.

7. The display device of claim 3, wherein a frame comprises a data write period during which data signal is supplied through the data line, a first period before the data write period, a second period before the first period, and a third period after the second period, and wherein the first transistor is turned on in the data write period, the fourth transistor is turned on in the first period, the third transistor is turned on in the second period, and the second transistor is turned on in the third period.

8. The display device of claim 3, wherein each of the plurality of pixels further includes:

a sixth transistor connected between a fourth voltage line and one of a first electrode of the driving transistor and the second electrode of the driving transistor.

9. The display device of claim 8, wherein a frame comprises a data write period during which data signal is supplied through the data line, a first period before the data write period, a second period after the data write period, and a third period between the data write period and the second period, and wherein the first transistor is turned on in the data write period, the fourth transistor is turned on in the first period, the third transistor and the sixth transistor are turned on in the second period, and the second transistor is turned on in the third period.

10. The display device of claim 8, wherein a frame comprises a data write period during which data signal is supplied through the data line, a first period before the data write period, a second period before the first period, and a third period after the second period, and wherein the first transistor is turned on in the data write period, the fourth transistor is turned on in the first period, the third transistor and the sixth transistor are turned on in the second period, and the second transistor is turned on in the third period.

11. The display device of claim 8, wherein the fourth voltage line comprises a fifth voltage line and a sixth voltage line, wherein the fifth voltage line is connected to the sixth transistor of a first pixel emitting light of a first color among the plurality of pixels and the sixth voltage line is connected to the sixth transistor of a second pixel emitting light of a second color among the plurality of pixels, and wherein a voltage supplied through the fifth voltage line is different from a voltage supplied through the sixth voltage line.

12. The display device of claim 11, wherein the fifth voltage line is connected to the third transistor of a third pixel emitting light of a third color among the plurality of pixels.

13. The display device of claim 11, wherein the fourth voltage line further comprises a seventh voltage line, and wherein the seventh voltage line is connected to the sixth transistor of a third pixel emitting light of a third color among the plurality of pixels, and wherein a voltage supplied through the fifth voltage line, a voltage supplied through the sixth voltage line, and a voltage supplied through the seventh voltage line are different from each other.

14. The display device of claim 8, wherein the sixth transistor includes a first bias transistor and a second bias transistor, the first bias transistor being connected between the first electrode of the driving transistor and the fourth voltage line, and the second bias transistor being connected between the second electrode of the driving transistor and the fourth voltage line, and wherein the first bias transistor and the second bias transistor are simultaneously turned on.

15. The display device of claim 8, wherein each of the plurality of pixels further includes a capacitor connected between the gate electrode of the driving transistor and a driving voltage line.

16. The display device of claim 1, wherein the first voltage line is connected to the third transistor of a third pixel emitting light of a third color among the plurality of pixels.

* * * * *